(12) United States Patent
Manion et al.

(10) Patent No.: US 7,752,253 B2
(45) Date of Patent: Jul. 6, 2010

(54) COLLABORATIVE INVITATION SYSTEM AND METHOD

(75) Inventors: Todd R. Manion, Redmond, WA (US); David G. Thaler, Redmond, WA (US); Rohit Gupta, Redmond, WA (US); Sandeep K. Singhal, Kirkland, WA (US); Ravi T. Rao, Redmond, WA (US); Tomer Weisberg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1356 days.

(21) Appl. No.: 11/114,634

(22) Filed: Apr. 25, 2005

(65) Prior Publication Data

US 2006/0242639 A1 Oct. 26, 2006

(51) Int. Cl.
*G06F 19/00* (2006.01)
(52) U.S. Cl. .................... 709/200; 709/205
(58) Field of Classification Search ........ 709/20, 709/203–206, 237, 219; 715/725, 753, 715
See application file for complete search history.

(56) References Cited

U.S. PATENT DOCUMENTS

| | | | |
|---|---|---|---|
| 5,557,727 A * | 9/1996 | Nagai | 345/440 |
| 5,617,539 A * | 4/1997 | Ludwig et al. | 709/205 |
| 5,706,462 A | 1/1998 | Matousek | |
| 5,724,508 A * | 3/1998 | Harple et al. | 709/205 |
| 5,802,294 A * | 9/1998 | Ludwig et al. | 709/204 |
| 5,854,898 A | 12/1998 | Riddle | |
| 5,917,480 A | 6/1999 | Tafoya et al. | |
| 5,987,376 A | 11/1999 | Olson et al. | |
| 6,078,948 A | 6/2000 | Podgorny et al. | |
| 6,108,687 A | 8/2000 | Craig | |
| 6,155,840 A | 12/2000 | Sallette | |

(Continued)

FOREIGN PATENT DOCUMENTS

GB 2 378 268 2/2003

(Continued)

OTHER PUBLICATIONS

International Search Report for PCT/US05/28581 mailed Dec. 16, 2005.

(Continued)

*Primary Examiner*—Kidest Bahta
(74) *Attorney, Agent, or Firm*—Marshall, Gerstein & Borun LLP

(57) ABSTRACT

A set of collaborative contacts may be selected with an invitation user interface. An invitation to participate in a collaborative activity may be sent to the selected contacts from the invitation user interface or from a collaborative application. The invitation may be received by a collaborative services platform. A user of the collaborative services platform may be presented with the invitation along with an ability to choose one of accept, decline and ignore in response to the invitation. The user may choose to accept, decline or explicitly ignore the invitation, and a response may be sent to the sender of the invitation indicating the user's choice. An application programming interface for a collaborative invitation service of the collaborative services platform may include an invitation element, a send invitation element, a respond to invitation element and a cancel invitation element. The cancel invitation element may be used to cancel issued invitations.

20 Claims, 20 Drawing Sheets

U.S. PATENT DOCUMENTS

| | | | |
|---|---|---|---|
| 6,163,809 | A | 12/2000 | Buckley |
| 6,216,110 | B1 | 4/2001 | Silverberg |
| 6,237,025 | B1 | 5/2001 | Ludwig et al. |
| 6,363,352 | B1 | 3/2002 | Dailey et al. |
| 6,526,411 | B1 | 2/2003 | Ward |
| 6,636,889 | B1 | 10/2003 | Estrada et al. |
| 6,658,568 | B1 | 12/2003 | Ginter et al. |
| 6,675,205 | B2 | 1/2004 | Meadway et al. |
| 6,701,344 | B1 | 3/2004 | Holt et al. |
| 6,714,966 | B1 | 3/2004 | Holt et al. |
| 6,728,753 | B1 | 4/2004 | Parasnis et al. |
| 6,745,178 | B1 | 6/2004 | Emens et al. |
| 6,791,582 | B2 | 9/2004 | Linsey et al. |
| 6,801,604 | B2 | 10/2004 | Maes et al. |
| 6,968,179 | B1 | 11/2005 | De Vries |
| 6,986,046 | B1* | 1/2006 | Tuvell et al. ............... 713/171 |
| 7,185,054 | B1* | 2/2007 | Ludwig et al. ............. 709/204 |
| 7,275,215 | B2 | 9/2007 | Werndorfer et al. |
| 7,383,433 | B2 | 6/2008 | Yeager et al. |
| 7,464,168 | B1 | 12/2008 | Abdelaziz et al. |
| 7,617,281 | B2 | 11/2009 | Manion et al. |
| 2001/0035976 | A1 | 11/2001 | Poon |
| 2001/0053213 | A1 | 12/2001 | Truong |
| 2002/0059425 | A1 | 5/2002 | Belfiore et al. |
| 2002/0073204 | A1 | 6/2002 | Dutta et al. |
| 2002/0097267 | A1 | 7/2002 | Dinan et al. |
| 2002/0140730 | A1 | 10/2002 | Linsey et al. |
| 2002/0143989 | A1 | 10/2002 | Huitema et al. |
| 2002/0154172 | A1 | 10/2002 | Linsey et al. |
| 2002/0184358 | A1 | 12/2002 | Traversat et al. |
| 2003/0014485 | A1 | 1/2003 | Banatwala |
| 2003/0036941 | A1 | 2/2003 | Leska et al. |
| 2003/0055892 | A1* | 3/2003 | Huitema et al. ............ 709/204 |
| 2003/0088544 | A1 | 5/2003 | Kan et al. |
| 2003/0126027 | A1 | 7/2003 | Nelson et al. |
| 2003/0135629 | A1 | 7/2003 | Sasaki et al. |
| 2003/0158897 | A1 | 8/2003 | Ben-Natan et al. |
| 2003/0217073 | A1 | 11/2003 | Walther et al. |
| 2003/0217142 | A1 | 11/2003 | Bobde et al. |
| 2004/0037271 | A1 | 2/2004 | Liscano et al. |
| 2004/0064568 | A1* | 4/2004 | Arora et al. ................. 709/228 |
| 2004/0078436 | A1 | 4/2004 | Demsky et al. |
| 2004/0082351 | A1 | 4/2004 | Westman |
| 2004/0088325 | A1 | 5/2004 | Elder et al. |
| 2004/0088646 | A1* | 5/2004 | Yeager et al. ............... 715/500 |
| 2004/0111423 | A1 | 6/2004 | Irving et al. |
| 2004/0117446 | A1 | 6/2004 | Swanson |
| 2004/0122898 | A1* | 6/2004 | Srinivasa .................... 709/205 |
| 2004/0122901 | A1* | 6/2004 | Sylvain ...................... 709/206 |
| 2004/0128350 | A1 | 7/2004 | Topfl et al. |
| 2004/0141005 | A1 | 7/2004 | Banatwala et al. |
| 2004/0143603 | A1 | 7/2004 | Kaufmann et al. |
| 2004/0172455 | A1 | 9/2004 | Green et al. |
| 2004/0172456 | A1 | 9/2004 | Green et al. |
| 2004/0184445 | A1 | 9/2004 | Burne |
| 2004/0243580 | A1 | 12/2004 | Markki et al. |
| 2004/0249970 | A1 | 12/2004 | Castro et al. |
| 2004/0260771 | A1 | 12/2004 | Gusler et al. |
| 2005/0009537 | A1 | 1/2005 | Crocker et al. |
| 2005/0027805 | A1 | 2/2005 | Aoki |
| 2005/0038856 | A1 | 2/2005 | Krishnasamy et al. |
| 2005/0066001 | A1 | 3/2005 | Benco et al. |
| 2005/0071440 | A1 | 3/2005 | Jones et al. |
| 2005/0080859 | A1 | 4/2005 | Lake |
| 2005/0102245 | A1 | 5/2005 | Edlund et al. |
| 2005/0102356 | A1 | 5/2005 | Manion et al. |
| 2005/0125496 | A1 | 6/2005 | Thuerk |
| 2005/0171799 | A1 | 8/2005 | Hull et al. |
| 2005/0198173 | A1 | 9/2005 | Evans |
| 2005/0235038 | A1 | 10/2005 | Donatella et al. |
| 2006/0004911 | A1 | 1/2006 | Becker et al. |
| 2006/0075091 | A1 | 4/2006 | Beyda et al. |
| 2006/0112177 | A1 | 5/2006 | Barkley et al. |
| 2006/0161554 | A1 | 7/2006 | Lucovsky et al. |
| 2006/0173959 | A1 | 8/2006 | McKelvie et al. |
| 2006/0190600 | A1 | 8/2006 | Blohm et al. |
| 2006/0239295 | A1 | 10/2006 | Rao et al. |
| 2006/0242235 | A1 | 10/2006 | Classen et al. |
| 2006/0242236 | A1 | 10/2006 | Manion et al. |

FOREIGN PATENT DOCUMENTS

| | | |
|---|---|---|
| JP | 2002-197246 A | 7/2002 |
| WO | WO-01/20450 | 3/2001 |
| WO | WO-2004059550 A1 | 7/2004 |

OTHER PUBLICATIONS

Written Opinion for PCT/US05/28581 mailed Dec. 16, 2005.

Handley, et al., "SIP: Session Initiation Protocol," *Network Working Group*, Request for Comments 2543, pp. 1-153 (Mar. 1999).

Handley et al., "SIP: Session Initiation Protocol," Network Working Group, Request for Comments 2543, pp. 1-153 (Mar. 1999).

Kindberg, "Mushroom: A Framework for Collaboration and Interaction Acros the Internet," in Proceedings of the Fifth ERCIM Workshop on CSCW and the Web (St. Augustin, Germany, Feb. 1996).

Cugola et al., "Peer to Peer for Collaborative Applications," in Proceedings of the 22nd International Conference on Distributed Computing Systems Workshops (ICDCS'02), pp. 359-364 (Vienna, Austria, Jul. 2-5, 2002).

"*Connecting and Extending Peer-to-Peer Networks*," Lion Share White Paper, dated Oct. 2004, 32 pages, http://lionshare.its.psu.edu/main/info/docspresentation/LionshareWP.pdf.

Smith et al., "The Social Life of Small Graphical Chat Spaces," in Proceedings of the SIGCHI Conference on Human Factors in Computing Systems, pp. 462-469 (The Hague, Netherlands, Mar. 2000) http://research.microsoft.com/scg/papers/vchatchi2000.pdf.

Druschel, P., et al., *PAST: A large-scale, persistent peer-to-peer storage utility*, at Rice University and Microsoft Research, 6 pages (Nov. 2001).

Tyson, "How the Old Napster Worked," http://computer.howstuffworks.com/napster.htm/printable.

Boyer et al., "Virtual Social Clubs: Meeting Places for the Internet Community," IEEE International Conference on Multimedia Computing and Systems, pp. 297-301 (Florence, Italy, Jun. 7-11, 1999).

Castro et al., "*Topology-Aware Routing in Structured Peer-to-Peer Overlay Networks*," Technical Report MSR-TR-2002-82, Microsoft Research, Microsoft Corporation, http://www.research.microsoft.com.

Ellison, C., *SPKI Requirements*, (The Internet Society 1999), at http://www.ietf.org/rfc/rfc2692.txt?number=2692 (Aug. 6, 2001).

Smith et al., "What Do People Do in Virtual Worlds? An Analysis of V-Chat Log File Data," Microsoft Corporation Report (Apr. 1, 1998) http://research.microsoft.com/scg/papers/kollockvpchat.pdf.

Rowstron et al., *Pastry: Scalable, distributed object location and routing for large-scale peer-to-peer systems*, at Microsoft Research, Ltd., St. George House and Rice University, 20 pages (Nov. 2001).

MeetingMaker—Meeting Maker printout, 2 pages printed on Jul. 1, 2005 from http://www.meetingmaker.com/products/meetingmaker/default.cfm.

Lai, K. et al., *Measuring Link Bandwidths Using a Deterministic Model of Packet Delay*, at Department of Computer Science at Stanford University, 13 pages (Oct. 2000).

Duhr, "Oberflachenelemente in interaktiven and kooperativen anwendungen," Universitat Oldenburg, Department of Information Systems Thesis (Aug. 2000).

Lee et al., "Supporting Multi-User, Multi-Applet Workspaces in CBE," in Proceedings of the ACM 1996 Conference on Computer Supported Cooperative Work, pp. 344-353 (Cambridge, MA, 1996.

Rowstron et al., *Storage management and caching in PAST, a large-scale, persistent peer-to-peer storage utility*, at Microsoft Research, Ltd., St. George House and Rice University, 14 pages (2001).

*Red-Black Tree*, National Institute of Standards and Technology, at http://www.nist.gov/dads/HTML/redblack.html (Mar. 5, 2002).

Cheung, "*Chatopus for Palm OS, Using IM Bots for Jabber*," Chatopus-Palm OS Instant Messaging Client for XMPP/Jabber, Dated Oct. 20, 2002 (Last updated: Jun. 25, 2005), 6 pages, http://www.chatopus.com/articles/bots.html.

Schmidt et al., "A Generic System for Web-Based Group Interaction," in Proceedings of the Thirty-First Hawaii International Conference on System Sciences, vol. I, pp. 545-554 (Kohala Coast, HI, Jan. 6-9, 1998).

Dorohonceanu et al., "A Desktop Design for Synchronous Collaboration," in Proceedings of the Graphics Interface '99 (GI'99), pp. 27-35 (Kingston, Ontario, Canada, Jun. 1999).

Rowstron et al., *SCRIB: The design of a large-scale event notification infrastructure*, at Microsoft Research, Ltd., St. George House and Rice University, 20 pages (2001).

Gutwin, "Workspace Awareness in Real-Time Distributed Groupware," The University of Calgary, Department of Computer Science, Ph.D. Thesis, 270 pages (Dec. 1997).

Bouvin, "Designing User Interfaces for Collaborative Web-Based Open Hypermedia," in Proceedings of the Eleventh ACM Conference on Hypertext and Hypermedia, pp. 230-231 (San Antonio, TX, 2000).

"At What Cost Pervasive? A Social Computing View of Mobile Computing Systems," IBM Research: vol. 38, No. 4, 1999, Pervasive Computing (28 pgs.).

"Publication Related to Pastry," http://research.microsoft.com/~antr/Pastry/pubs.htm.

Castro et al., "*Secure Routing for Structured Peer-to-Peer Overlay Networks*," Usenix, OSDI '02 Paper (OSDI '02 Tech Program Index) pp. 299-314 of the Proceedings, Fifth Symposium on Operating Systems Design and Implementation (OSDI 2002) 33 pages, http://www.usenix.org/events/osdi02/tech/full_papers/castro/castro_html/.

The Best Way to Centrally Deploy Applications and Provide On-Demand Access, 2 pages printed Jul. 1, 2005 from http://www.citrix.com/English/ps2/products/product.asp?contentID=186.

"IBM Workplace Collaboration Services Overview Guide" dated Jan. 2005, 2 pages. (Printed from ftp://ftp.lotus.com/pub/lotusweb/IGM_Workplace_collaboration_services_g224733301_118.pdf on Jul. 1, 2005).

The Gnutella Protocol Specification v0.4, http://www.clip2.com.

"IBM Lotus Instant Messaging and Web Conferencing," IBM Software—IBM Lotus Instant Messaging and Web Conferencing home page (3 pgs.).

Garcia et al., "Extending a Collaborative Architecture to Support Emotional Awareness," EBAA '99—Workshop on Emotion-Based Agent Architectures, pp. 46-52 (May 2, 1999).

"*Presence and Awareness Services*," Ramiro Liscano, Professor, SITE, University of Ottawa, 89 pages, http://www.site.uottawa.ca/~rliscano/tutorials/PresenceAwarenessServices.pdf.

Ellison, C., et al., *SPKI Certificate Theory*, (The Internet Society 1999), at http://www.ietf.org/rfc/rfc2693.txt?number=2693 (Aug. 6, 2001).

Cheng et al., "Hutchworld: Lessons Learned. A Collaborative Project: Fred Hutchinson Cancer Research Center & Microsoft Research," in Proceedings of Second International Conference onVirtual Worlds (VW 2000), pp. 1-2 (Paris, France, Jul. 5-7, 2000). http://research.microsoft.com/scg/papers/hutchvw2000.pdf.

MeetingMaker—WebEvent Publish printout, 2 pages printed on Jul. 1, 2005 from http://www.meetingmaker.com/products/webevent_publish/default.cfm.

Farnham et al., "Supporting Sociability in a Shared Browser," in Proceedings of Interact Conference (Tokyo, Japan, Jul. 2001) http://research.microsoft.com/scg/papers/sharedbrowsinginteract.pdf, pp. 1-8.

Langley, A., *The Freenet Protocol*, The Free Network Project, at http://freenet.sourceforge.net/index/php?page=protocol (May 21, 2001).

Zhao, et al., "A Web Based Multi-Display Presentation System," 2 pages printed Jul. 1, 2005 from http://www.fxpal.com/publications/FXPAL-PR-04-303.pdf.

Erdelsky, P., *The Birthday Paradox*, EFG, at http://www.efgh.com/math/birthday.htm (Mar. 8, 2002).

Kollock, "The Economies of Online Cooperation: Gifts and Public Goods in Cyberspace," in Communities in Cyberspace, (Smith et al, eds.), pp. 1-17 (Routledge, London, UK, 1999) http://www.sscnet.ucla.edu/soc/faculty/kollock/papers/economies.htm.

Greenberg, "Collaborative Interfaces for the Web," in Human Factors and Web Development, (Forsythe et al., eds.) Chapter 18, pp. 241-253, LEA Press, (1997).

SlidesNow! (3 pages) printed Jul. 1, 2005 from http://www.slidesnow.com/about.shtml.

Ellison, C., et al., *Simple Public Key Certificate*, (Internet Draft 1999), at http://www.world.std.com/~cme/spki.txt (Aug. 6, 2001).

QuickTime Broadcaster (3 pages) printed Jul. 1, 2005 from http://www.apple.com/guicktime/broadcaster/.

Kollock et al., "Managing the Virtual Commons: Cooperation and Conflict in Computer Communities," in Computer-Mediated Communication: Linguistic, Social, and Cross-Cultural Perspectives, (Herring, ed.), pp. 109-128 (John Benjamins, Amsterdam, Netherlands, 1996) http://research.microsoft.com/scg/papers/KollockCommons.htm.

Dabek, F., et al., *Building Peer-to-Peer Systems With Chord, a Distributed Lookup Service*, at MIT Laboratory for Computer Science, 6 pages, at http://pdos.lcs.mit.edu/chord (May 2001).

"Design Explorations," IBM Research: Social Computing Group (4 pgs.).

Greenberg et al, "Using a Room Metaphor to Ease Transitions in Groupware," University of Calgary, Department of Computer Science, Research Report 98/611/02, 31 pages (1998).

About Presentation Broadcasting, 3 pages printed Jul. 1, 2005 from http://office.microsoft.com/en-us/assistance/HP052411931033.aspx.

\* cited by examiner

COLLABORATIVE INVITATION SYSTEM AND METHOD

FIELD OF THE INVENTION

This invention pertains generally to networked computing environments and, more particularly, to facilitated collaboration in networked computing environments.

BACKGROUND OF THE INVENTION

Networked computing environments have become common features of the workplace and even the home. These environments facilitate a variety of modes of communication including electronic mail, instant messaging, multimedia document servers, discussion groups, as well as streaming audio and video, and immersive interactive sensory environments. Conventional software applications have begun to take advantage of these rich modes of communication, but each has limitations and/or disadvantages when considered from the point of view of an integrated and extensible computerized collaboration platform.

Some conventional computer software applications provide aspects of collaborative services, but fail to provide effective access to collaborators. Clumsy and/or limited access to collaborators can present barriers to collaboration initiation, preventing the use of otherwise functional collaboration tools. An aspect of ineffective access to collaborators is a failure by some conventional software applications to effectively discern current physical and/or virtual location. Another aspect is a failure by some conventional software applications to effectively discern compatibilities with respect to collaborative functionality.

Beyond deficits in functionality of particular releases of conventional software applications providing aspects of collaborative services, some conventional software applications fail to provide for an extensible collaboration platform, framework, and/or architecture. This is no minor failing. An effective architecture may last many years and be incorporated into network computing environments with millions of nodes. Failures of extensibility, flexibility, maintainability and/or scalability of an established architecture may be a much more significant problem than for a single software product release.

BRIEF SUMMARY OF THE INVENTION

This section presents a simplified summary of some embodiments of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

In an embodiment of the invention, one or more contacts may be selected with an invitation user interface such as a graphical user interface (GUI). An invitation to participate in a collaborative activity may be sent to the selected contacts from the invitation user interface or from a collaborative application, for example, a collaborative application that facilitates the collaborative activity. Whether the invitation is sent from the invitation user interface or from the collaborative application may be a configurable option. If the invitation is to be sent from the invitation user interface then the collaborative application may be launched and then the invitation may be sent from the invitation user interface. If the invitation is to be sent from the collaborative application then the collaborative application may be launched and then the invitation may be sent from the collaborative application.

In an embodiment of the invention, the invitation to participate in the collaborative application may be received, for example, by a collaborative services platform. A user of the collaborative services platform may be presented with the invitation along with an ability to choose one of accept, decline and ignore in response to the invitation. The user may choose to accept, decline or explicitly ignore the invitation, and a response may be sent to the sender of the invitation indicating the user's choice.

In an embodiment of the invention, an application programming interface for a collaborative invitation service includes an invitation element, a send invitation element, a respond to invitation element and a cancel invitation element. The invitation element may provide access to invitation data corresponding to an invitation to participate in a collaborative activity. The send invitation element may be used to send collaborative invitations to one or more contacts. The respond to invitation element may be used to respond to collaborative invitations, and the cancel invitation element may be used to cancel issued invitations.

BRIEF DESCRIPTION OF THE DRAWINGS

While the appended claims set forth the features of the invention with particularity, the invention and its advantages are best understood from the following detailed description taken in conjunction with the accompanying drawings, of which:

DETAILED DESCRIPTION OF THE INVENTION

Prior to proceeding with a description of the various embodiments of the invention, a description of a computer in which the various embodiments of the invention may be practiced is now provided. Although not required, the invention will be described in the general context of computer-executable instructions, such as program modules, being executed by a computer. Generally, programs include routines, objects, components, data structures and the like that perform particular tasks or implement particular abstract data types. The term "program" as used herein may connote a single program module or multiple program modules acting in concert. The terms "computer" and "computing device" as used herein include any device that electronically executes one or more programs, such as personal computers (PCs), hand-held devices, multi-processor systems, microprocessor-based programmable consumer electronics, network PCs, minicomputers, tablet PCs, laptop computers, consumer appliances having a microprocessor or microcontroller, routers, gateways, hubs and the like. The invention may also be employed in distributed computing environments, where tasks are performed by remote processing devices that are linked through a communications network. In a distributed computing environment, programs may be located in both local and remote memory storage devices.

Figure 1:
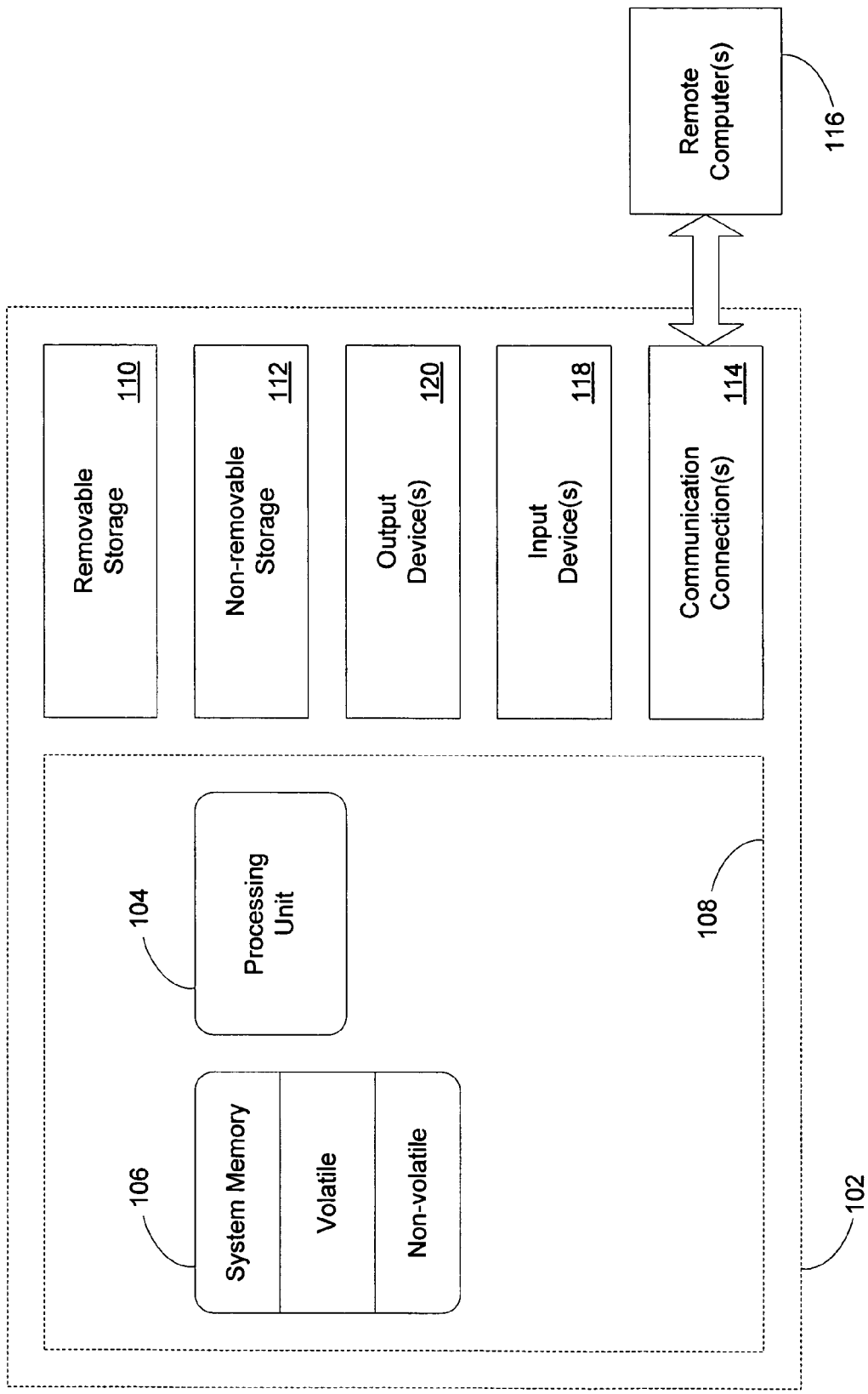
FIG. 1 is a schematic diagram generally illustrating an exemplary computer system usable to implement an embodiment of the invention.

Referring to FIG. 1, an example of a basic configuration for the computer 102 on which aspects of the invention described herein may be implemented is shown. In its most basic configuration, the computer 102 typically includes at least one processing unit 104 and memory 106. The processing unit 104 executes instructions to carry out tasks in accordance with various embodiments of the invention. In carrying out such tasks, the processing unit 104 may transmit electronic signals to other parts of the computer 102 and to devices outside of the computer 102 to cause some result. Depending on the exact configuration and type of the computer 102, the memory 106 may be volatile (such as RAM), non-volatile (such as ROM or flash memory) or some combination of the two. This most basic configuration is illustrated in FIG. 1 by dashed line 108.

The computer 102 may also have additional features/functionality. For example, computer 102 may also include additional storage (removable 110 and/or non-removable 112) including, but not limited to, magnetic or optical disks or tape. Computer storage media includes volatile and non-volatile, removable and non-removable media implemented in any method or technology for storage of information, including computer-executable instructions, data structures, program modules, or other data. Computer storage media includes, but is not limited to, RAM, ROM, EEPROM, flash memory, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 102. Any such computer storage media may be part of computer 102.

The computer 102 preferably also contains communications connections 114 that allow the device to communicate with other devices such as remote computer(s) 116. A communication connection is an example of a communication medium. Communication media typically embody computer readable instructions, data structures, program modules or other data in a modulated data signal such as a carrier wave or other transport mechanism and includes any information delivery media. By way of example, and not limitation, the term "communication media" includes wireless media such as acoustic, RF, infrared and other wireless media. The term "computer-readable medium" as used herein includes both computer storage media and communication media.

The computer 102 may also have input devices 118 such as a keyboard/keypad, mouse, pen, voice input device, touch input device, etc. Output devices 120 such as a display, speakers, a printer, etc. may also be included. All these devices are well known in the art and need not be described at length here.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

In an embodiment of the invention, a computer software architecture provides an extensible, flexible, maintainable and scalable collaboration platform. Aspects of the architecture may be incorporated into a suitable networked computing environment. The architecture may enable and/or extend integrated collaboration with conventional computer software applications. In particular, the architecture may provide for comprehensive collaborative contact management, including current contact presence in a networked computing environment and current contact capabilities, for example, with respect to available collaborative activities.

Figure 2:
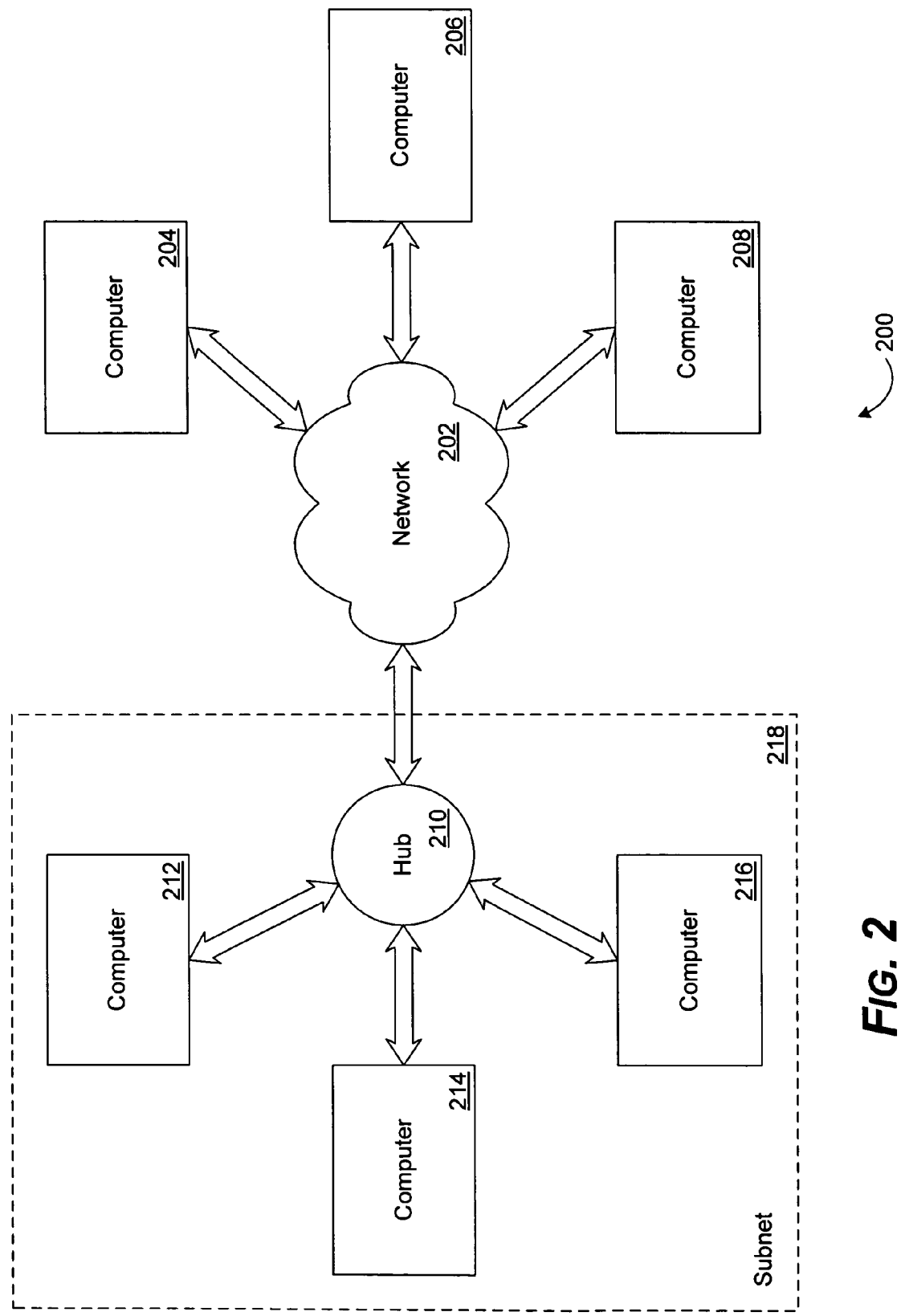
FIG. 2 is a schematic diagram depicting an example networked computing environment suitable for incorporating an embodiment of the invention.

FIG. 2 depicts an example networked computing environment 200 suitable for incorporating an embodiment of the invention. In the networked computing environment a network 202 communicatively connects computers 204, 206 and 208 to a networking hub 210. The network 202 may be a local area network (LAN), a metropolitan area network (MAN), a wide area network (WAN), a personal area network (PAN) or a combination thereof. The network 202 may incorporate any suitable networking components such as hubs, gateways, routers, bridges, ports and the like, as well as any suitable computer readable medium. For example, the computers 204, 206, 208 and the networking hub 210 may each be instances of the computer 102 (FIG. 1).

The networking hub 210 may communicatively connect computers 212, 214 and 216. The networking hub 210 and the computers 212, 214 and 216 may together be regarded as an example of a sub-network or subnet 218, although, of course, not a limiting example. The computers 212, 214 and 216 are said to be on the same subnet, and may enjoy privileged network communication with respect to each other as a result. For example, even though each computer 204, 206, 208, 212, 214 and 216 may send point-to-point type messages to each other computer 204, 206, 208, 212, 214 and 216, the subnet 218 may be configured such that broadcast type messages in the subnet 218 are received by those computers 212, 214 and 216 in the subnet 218.

Figure 3:
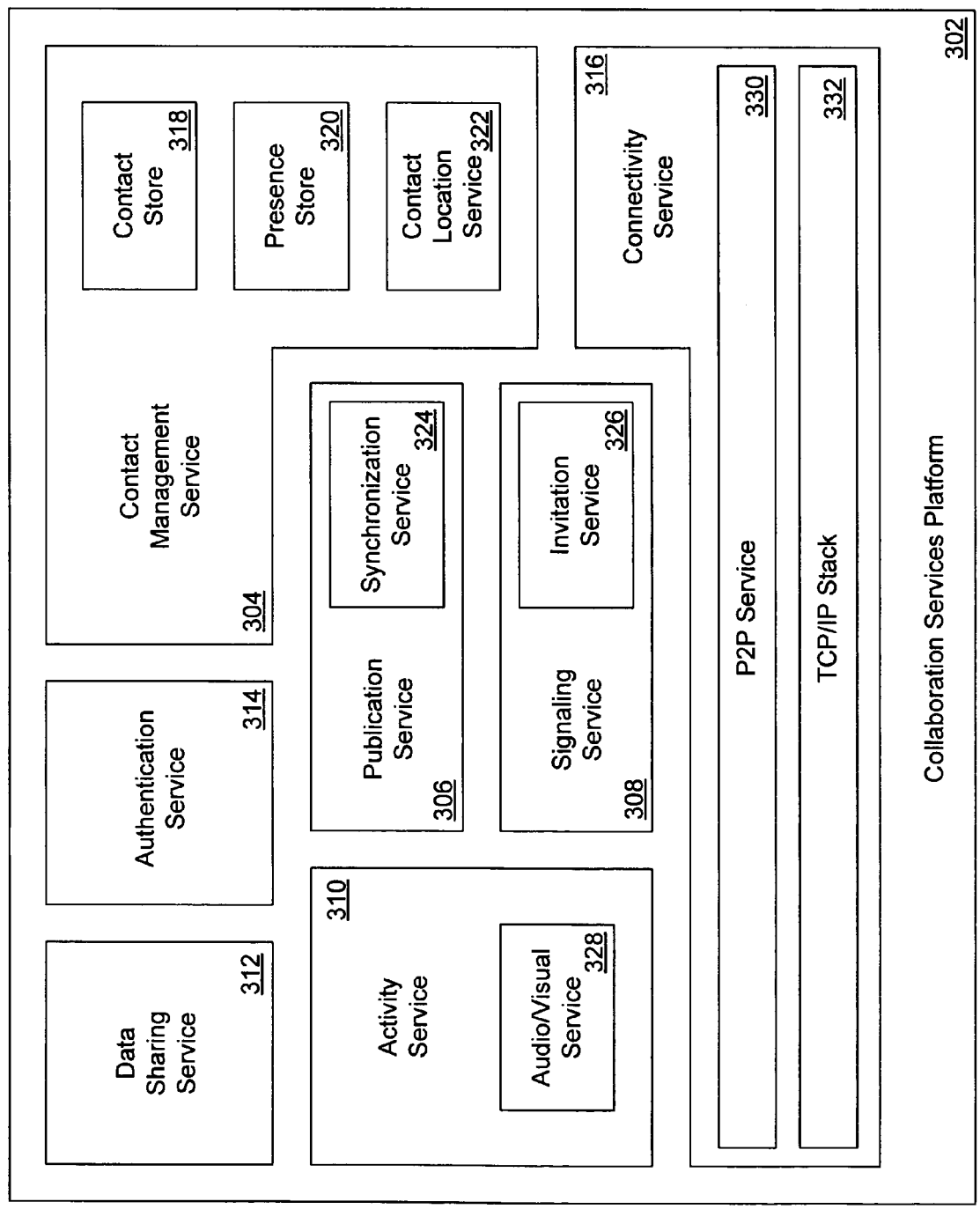
FIG. 3 is a block diagram depicting an example computer software architecture for a collaboration services platform in accordance with an embodiment of the invention.

The extensible, flexible, maintainable and/or scalable attributes of the collaboration platform may arise from one or more aspects of its modular structure, its modular structure as a whole, modes of interaction between ones of the modules and/or the interaction patterns of the modular structure as a whole. FIG. 3 depicts an example computer software architecture 300 in accordance with an embodiment of the invention. Each aspect of the architecture 300 may be present at each computer 204, 206, 208, 212, 214 and 216 (FIG. 2), however, each embodiment of the invention is not so limited. Aspects of the architecture 300 may be suitably distributed across any suitable subset of the networked computing environment 200, including the networked computing environment 200 as a whole. Different versions of the architecture 300 may be present at different computers, and the degree to which each version of the architecture 300 is compatible with each other version of the architecture 300 may vary.

The architecture 300 may include a collaboration services platform 302. The collaboration services platform 302 may include a contact management service 304, a publication service 306, a signaling service 308, an activity service 310, a data sharing service 312, an authentication service 314 and a connectivity service 316. The contact management service 304 may include a contact store 318, a presence store 320, and a contact location service 322. The publication service 306 may include a synchronization service 324. The signaling service 308 may include an invitation service 326. The activity service 310 may include an audio/visual (A/V) service 328. The connectivity service 316 may include a peer-to-peer (P2P) service 330, and a conventional transport control protocol and internet protocol (TCP/IP) stack 332. Each service 304, 306, 308, 310, 312, 314, 316 may include and/or be incorporated into a peer capable of sending and receiving messages implementing the service.

In an embodiment of the invention, the contact management service 304 provides effective access to collaborators, that is, to users of the collaborative services platform 302. For example, the contact management service 304 may provide contact information for some or all of the users of the collaborative services platform 302. The contact management service 304 may maintain a database of contacts in one or more data stores. Each contact may be a potential collaborator, that is, a user of the collaboration services platform may attempt to engage in one or more collaboration activities with each contact. The contact management service 304 may provide one or more user interfaces, including graphical user interfaces (GUI), that present the contacts, for example, for selection by the user and/or so that the user may invoke a collaboration services platform 302 action with respect to a particular contact.

The contact store 318 may store contact objects and "MeContact" objects (described in more detail below with reference to FIG. 4). The presence store 320 may store presence objects (also described in more detail below with reference to FIG. 4) for the contact objects. In an embodiment of the invention, presence data changes more frequently than contact data, so that the separate data stores 318, 320 may be optimized for different object update frequencies.

The contact location service 322 may provide one or more of a variety of location data with respect to a given contact. Physical proximity may be an aspect of contact location, for example, one or more proxies for physical location may be utilized to estimate a physical distance of a contact from the user. Signal strength at a radio receiver is an example of a physical distance proxy. Virtual location may be another aspect of contact location. For example, a contact may be active at one or more networks, such as network 202 of FIG. 2, and/or one or more network nodes, such as computers 204, 206, 208, 212, 214 and 216. In addition, a contact may be registered but inactive, or online but undiscovered, or have some other suitable locative status. The contact location service 322 may query a suitable registry and/or initiate, for example, a peer-to-peer search or a peer-to-peer name resolution mechanism, in order to locate a particular contact.

The publication service 306 may provide access to data published by contacts. In an embodiment of the invention, interested users may subscribe to objects published by contacts and receive notification whenever the published objects are updated by the publishing contact. The synchronization service 324 may be responsible for maintaining a database of publication subscriptions. In particular, the publication services 206 may provide access to presence information published by contacts.

The signaling service 308 may provide for the establishment and termination of collaborative conferences between contacts present in the networked computing environment 200 (FIG. 2), as well as for updating parameters of a conference in progress. In an embodiment of the invention, establishment, update and termination of collaborative conferences is provided in accordance with publish/subscribe semantics. In an embodiment of the invention, the signaling service 308 incorporate an implementation of a session initiation protocol (SIP) such as the session initiation protocol described by Handley et al., "SIP: Session Initiation Protocol," Internet Engineering Task Force (IETF) Request for Comments (RFC) 2543, March 1999.

The invitation service 326 may enable invitations and related messages to be sent to and from contacts. For example, a system user accessing the networked computing environment 200 (FIG. 2) at one computer 212 may invite a contact at some other computer(s) 204, 206, 208, 212, 214 and/or 216 to participate in a collaborative activity. The invitation service 326 may utilize the contact location service 322 to locate the contact and deliver the invitation. The invitation service 326 may include a variety of user interfaces such as graphical user interfaces (GUI) for presenting invitation details to an invitee and enabling the invitee to accept, decline and/or explicitly ignore the invitation. An example invitation service 326 is described below in more detail with reference to FIG. 13.

The activity service 310 may implement collaborative activities and/or provide support for the integration of collaborative applications into the collaboration services platform 302. For example, the activity service 310 may provide collaboration services platform 302 compliant application programming interfaces (APIs) to conventional collaboration applications. Compliant APIs may include functionality for querying a particular contact or computer 204, 206, 208, 212, 214, 216 (FIG. 2) with respect to activity capabilities, and for ascertaining application-specific invitation requirements. The audio/visual services 328 are an example of collaboration activities that are suitable for incorporation into the activity service 310.

The data sharing service 312 may enable sharing of data in any suitable format including files, documents, streams and objects. The data sharing service 312 may provide for data transfer, data replication and/or data synchronization. Data sharing may be enabled and disabled based on contact, participation in an activity, participation in a conference, and/or any suitable access control list (ACL) entry such as networked computing environment 200 (FIG. 2) user group.

The authentication service 314 may source and verify authentication credentials, for example, authentication credentials for contacts and other activity and conference participants. The authentication service 314 may enable the classification of contacts into trusted contacts and untrusted contacts. The authentication service 314 may enable contacts to be trusted independent of contact location and/or in accordance with sophisticated networked computing environment 200 (FIG. 2) presence.

In an embodiment of the invention, the connectivity service 316 enables communication between collaboration services platform 302 service instances throughout the networked computing environment 200 (FIG. 2), for example, between a first signaling service 308 instance at the computer 212 and a second signaling service 308 instance at the computer 208. The communication facilities of the connectivity service 316 may be made available with an application programming interface (API) so that other collaboration service platform 302 services 304, 306, 308, 310, 312, 314 may communicate between instances independent of the underlying transport mechanism.

The connectivity service 316 may include a TCP/IP stack 332 and/or higher level communication application programming interfaces such as the Microsoft® Windows® Sockets 2 (Winsock) API as described in the Windows® Sockets 2 section of the Microsoft® Windows® Platform Software Development Kit (SDK) in the Microsoft Developer Network (MSDN®) Library dated March, 2005. The peer-to-peer (P2P) service 330 may provide connectivity in an overlay network of the network computing environment 200. For example, the peer-to-peer service 330 may be provided in accordance with the peer-to-peer application programming interface described in the Windows® Peer-to-Peer Networking section of the Microsoft® Windows® Platform Software Development Kit (SDK) in the Microsoft Developer Network (MSDN®) Library dated March, 2005, including the graphing, grouping, identity manager, and peer name resolution protocol (PNRP) namespace provider application programming interfaces.

The services 304, 306, 308, 310, 312, 314 and 316 of the collaboration services platform 302 may be implemented with a set of programmatic objects including a set of collaboration objects interrelated in a collaboration object model.

Figure 4:
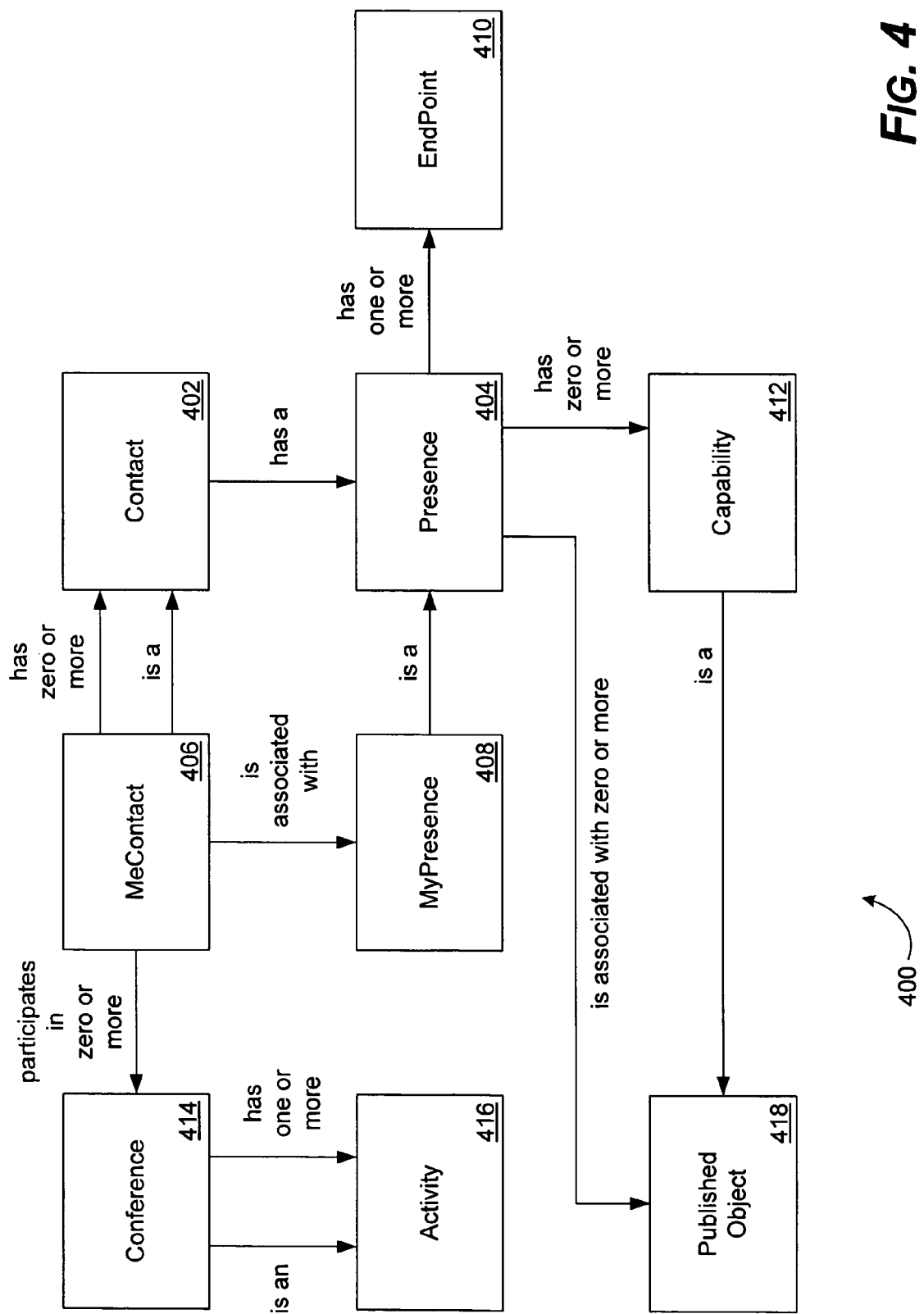
FIG. 4 is an object modeling diagram depicting an example collaboration object model in accordance with an embodiment of the invention.

FIG. 4 depicts an example set of collaboration objects and an example collaboration object model 400 in accordance with an embodiment of the invention. The collaboration object model 400 may include a contact object 402, a presence object 404, a MeContact object 406 and a MyPresence object 408, an endpoint object 410, a capability object 412, a conference object 414, an activity object 416, and a published object 418. Of course, the collaboration services platform 302 may include many instances of each type of collaboration object 402, 404, 406, 408, 410, 412, 414, 416 and 418.

The contact object 402 may incorporate suitable attributes for representing a collaborative participant and/or a user of the collaborative services platform 302 (FIG. 3). In particular, the contact object 402 may reference a collaborative presence, for example, a contact's presence in the networked computing environment 200 (FIG. 2). In an embodiment of the invention, the contact object 402 references a collaborative presence by referencing an instance of the presence object 404. An example contact object 402 is described in more detail below with reference to FIG. 5.

The presence object 404 may incorporate suitable attributes for representing a collaborative presence, for example, a set of computers 204, 206, 208, 212, 214 and/or 216 (FIG. 2) of the networked computing environment 200 at which a particular collaboration services platform 302 user has been active at some time in the recent past, where the "recent" past may vary from seconds to hours, days and even years depending upon the collaborative context. The presence object 404 may reference one or more endpoint object 410 instances representing networked computing environment 200 locations. Endpoint objects 410 needn't correspond one-to-one with computers 204, 206, 208, 212, 214, 216 of the networked computing environment 200, for example, because an endpoint object 410 may correspond to a peer in an overlay network of the networked computing environment 200.

The presence object 404 may further reference zero or more capability object 412 instances representing, for example, collaborative capabilities at one or more collaborative endpoints and/or an aggregate collaborative capability across some or all endpoints associated with the presence object 404. In addition, the presence object 404 may reference zero or more published object 418 instances. An example presence object 404 is described in more detail below with reference to FIG. 6. An example published object 418 is described in more detail below with reference to FIG. 7. An example capability object 412 is described in more detail below with reference to FIG. 8.

The MeContact object 406 may be a type of contact object 402, and may polymorphically inherit the attributes and behavior of the contact object 402. The MeContact object 406 may be differentiated from the contact object 402 because of the special role a collaboration services platform user's own contact information may play relative to the contact information of other users. For example, the MeContact object 406 may reference zero or more contact object 402 instances representing that particular user's known collaborative contacts. The MeContact object 406 needn't reference, for example, other MeContact object 406 instances. In an embodiment of the invention, unnecessary complexity is thus avoided contributing to the extensibility, flexibility, maintainability and/or scalability of the collaboration services platform 302 (FIG. 3).

The MeContact object 406 may further reference a MyPresence object 408 instance. The MyPresence object 408 may be a type of presence object 404, and may polymorphically inherit the attributes and behavior of the presence object 404. Again, the MyPresence object 408 may be differentiated from the presence object 404 because of the special role a collaboration services platform user's own presence may play relative to the presence of other users. For example, in an embodiment of the invention, the user may explicitly update their own MyPresence object 408 instance, but not the presence object 404 instances of other users.

In addition, the MeContact object 406 may reference zero or more conference object 414 instances representing collaborative conferences in which the user associated with the MeContact object 406 is currently and/or recently participating, along with other collaboration services platform users. The conference object 414 may reference one or more activity object 416 instances representing collaborative activities. In an embodiment of the invention, the conference object 414 is a type of activity object 416, and may polymorphically inherit the attributes and behavior of the activity object 416. As a result of being a type of activity object 416, the activity object 416 instances referenced by the conference object 414 may be conference object 414 instances. An example MeContact object 406 is described in more detail below with reference to FIG. 9. An example conference object 414 is described in more detail below with reference to FIG. 10.

Each collaborative object 402, 404, 406, 408, 410, 412, 414, 416 and 418 may offer an application programming interface for creating and deleting collaborative object 402, 404, 406, 408, 410, 412, 414, 416 and 418 instances, as well as for suitable queries and manipulations of collaborative object 402, 404, 406, 408, 410, 412, 414, 416 and 418 attributes. In an embodiment of the invention, where collaborative objects 402, 404, 406, 408, 410, 412, 414, 416 and 418 are described as referencing other collaborative objects 402, 404, 406, 408, 410, 412, 414, 416 and 418, the referenced objects, or copies thereof, may instead be incorporated into and/or made integral to the referencing object. One programmatic object may reference another with any suitable programmatic reference mechanism. Suitable programmatic reference mechanisms include pointers, explicit references, associated hash codes and their equivalents, as well as program language features designed specifically for the purpose.

The programmatic objects 402, 404, 406, 408, 410, 412, 414, 416 and 418 introduced above with reference to FIG. 4 are now described in more detail. Each programmatic object 402, 404, 406, 408, 410, 412, 414, 416 and 418 may include one or more application programming interface elements. Each application programming interface element may include one or more interface specifications that specify a manner in which computer 102 (FIG. 1) system components, including collaboration services platform 302 (FIG. 3) services, may configure, control and/or interact with the programmatic object 402, 404, 406, 408, 410, 412, 414, 416 and 418. As will be apparent to one of skill in the art, the interface specifications may include object attribute specifications, variable specifications, function call specifications, program object specifications, message specifications such as request/response message pairs, and/or any other suitable programming interface specification.

Figure 5:
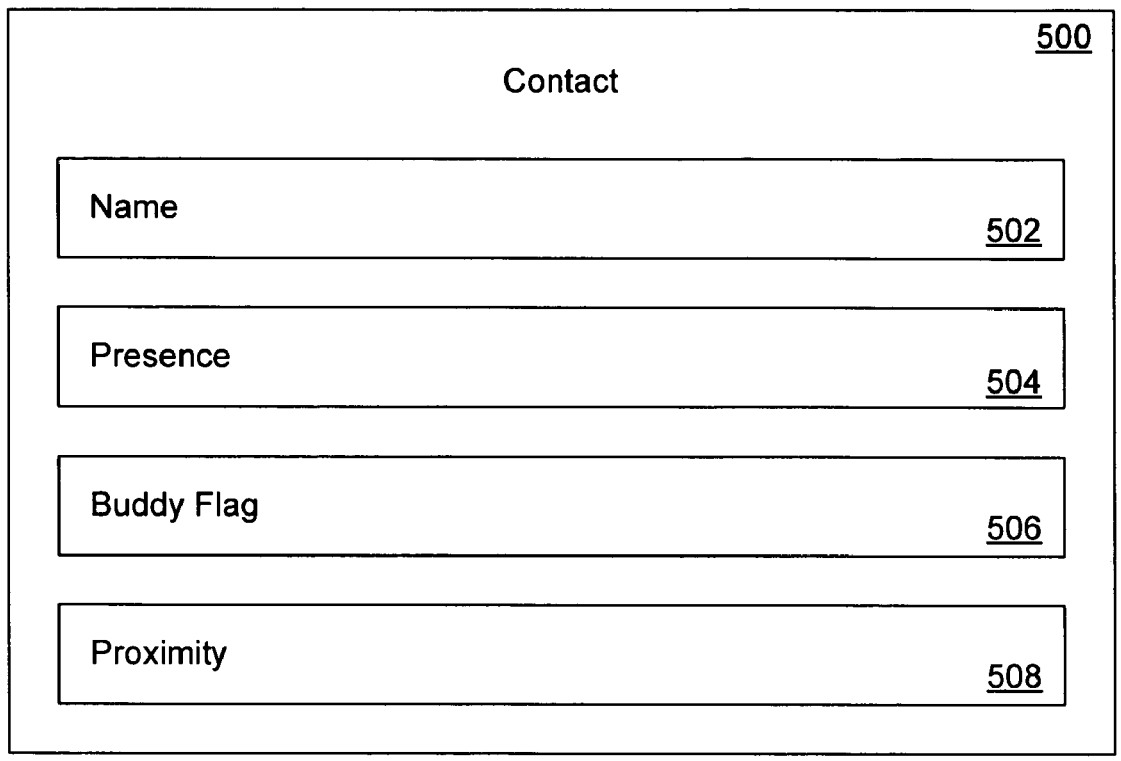
FIG. 5 is an object interface diagram depicting an example contact object in accordance with an embodiment of the invention.

FIG. 5 depicts an example contact object 500 in accordance with an embodiment of the invention. The contact object 500 is suitable for incorporation in the collaboration object model 400 (FIG. 4). The contact object 500 may incorporate application programming interface elements including a name element 502, a presence element 504, a buddy flag element 506, and a proximity element 508.

The name element 502 may include a friendly name for a contact associated with the contact object 500. The friendly name may be encoded, for example, as a rich text string. The presence element 504 may include a reference to a presence object 404 (FIG. 4) instance.

The buddy flag element 506 may include an indicator that the contact associated with the contact object 500 is categorized as a "buddy" class contact. Contacts categorized as buddies may be privileged in a variety of ways. For example, a buddy may be a trusted contact, buddies may be given priority, for example, invitation priority, and buddies may be automatically included in the set of contacts to which a collaboration services platform user subscribes, for example, for presence data. Buddy class contacts may be computationally more expensive than ordinary contacts, and their number may be limited, for example, with a test embedded in the buddy flag application programming interface element 506.

The proximity element 508 may include a physical proximity metric and/or a virtual proximity metric. For example, the physical proximity metric may be a measure of signal strength received at a wireless network interface. Of course, the proximity application programming interface element 508 need not be limited to a single metric in response to a proximity query. For example, the proximity query may request a raw proximity metric, a time-averaged proximity metric, a quantized proximity metric ("signal strength bars") and/or any suitable proximity metric.

Figure 6:
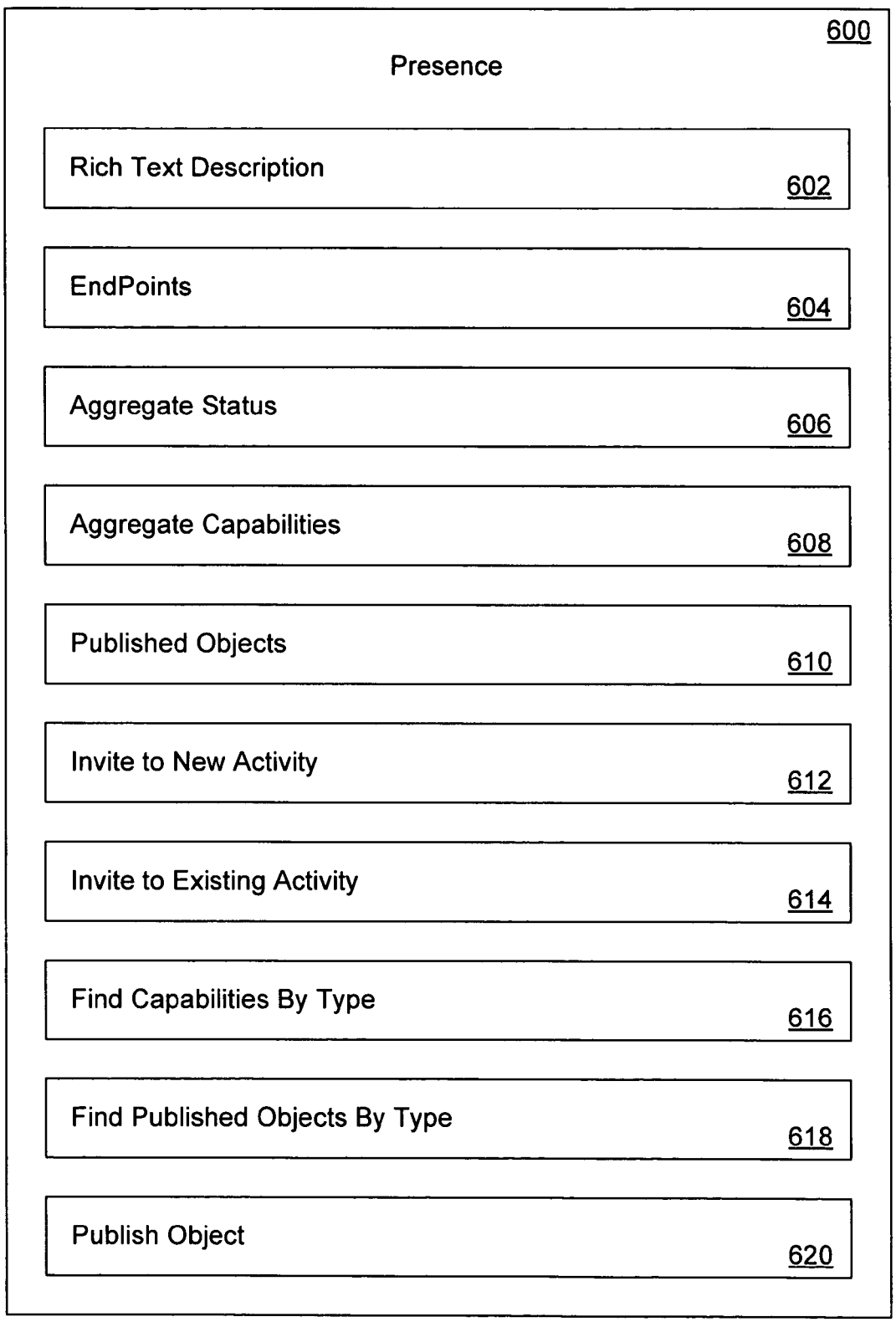
FIG. 6 is an object interface diagram depicting an example presence object in accordance with an embodiment of the invention.

FIG. 6 depicts an example presence object 600 in accordance with an embodiment of the invention. The presence object 600 is suitable for incorporation in the collaboration object model 400 (FIG. 4). The presence object 600 may incorporate application programming interface elements including a rich text description element 602, an endpoints element 604, an aggregate status element 606, an aggregate capabilities element 608, a published objects element 610, an invite to new activity element 612, an invite to existing activity element 614, a find capabilities by type element 616, a find published objects by type element 618, and a publish object element 620.

The rich text description element 602 may include a rich text string describing the networked computing environment 200 (FIG. 2) presence associated with the presence object 600. Simple examples include "Currently in Building 9," "Playing Halo®, Level 4," and "Unavailable." The endpoints element 604 may include a set of collaborative endpoints that are active, recently active, and/or capable of becoming active participants in one or more collaborative activities. Examples of suitable collaborative endpoints include computers 204, 206, 208, 212, 214 and 216, and peers of an overlay network of the networked computing environment 200.

The aggregate status element 606 may include an aggregate presence status indicator representative of collaborative presence across the set of collaborative endpoints. Each collaborative endpoint may have an associated presence status, for example, ONLINE, AWAY, OUT TO LUNCH, BE RIGHT BACK, IDLE, ON THE PHONE or BUSY. The aggregate presence status associated with a set of endpoints need not be the same as the status associated with any one of the endpoints in the set. Even when the aggregate presence status is the same as at least one of the endpoints in the set, it may be different from one or more of the others.

Aggregate presence status may be determined with one or more of a variety of aggregate presence status algorithms. The presence status levels may be ranked, and the aggregate status may be set to the highest ranked status in a set of endpoints. Aggregate status may be weighted average of individual status values, or other suitable linear or nonlinear transformation of individual status values. The individual status values may also be suitably sorted before being transformed. The aggregate presence status algorithm utilized may depend upon the number of individual endpoints in the set.

The aggregate capabilities element 608 may include a collection of aggregate capabilities associated with a collaborative presence. Each individual endpoint in the collaborative presence may have associated therewith a set of capabilities, for example, capabilities with respect to collaborative activities. The aggregate capabilities may be a simple aggregate of each of the capabilities of each of the individual endpoints. On the other hand, the collection of aggregate capabilities may be limited to those capabilities that are present at each of the individual endpoints. Combinations of these extremes are possible, as are more sophisticated aggregate capabilities determination algorithms. For example, the collection of aggregate capabilities may be a result of a weighted averaging process, or other suitable linear or nonlinear transformation of the capabilities of individual endpoints. In addition, an aggregate capability rank or percentage may be associated with each capability in the collection of aggregate capabilities.

The published objects element 610 may include a collection of published objects associated with the collaborative presence. While the capability object 412 (FIG. 4) may be a type of published object 418, the two are differentiated in that capabilities associated with instances of the capability object 412 are typically long-lived (e.g., on the order of days, weeks, or even years), whereas published data associated with instances of the base published object 418 are typically short-lived (e.g., on the order of seconds, minutes or hours). This differentiation may be exploited to optimize computer system performance.

The invite to new activity element 612 may enable a collaboration services platform 302 (FIG. 3) user to invite a contact associated with the presence object 600 to participate in a new collaborative activity. It may be that an associated conference for hosting the activity does not yet exist, and that one will be created if the invitation is accepted. The invitation may be delivered to each endpoint referenced by the endpoints element 604, only to those endpoints associated with an ONLINE presence status, the invitation may be delivered to each endpoint associated with the collaborative presence in an order, for example, an order determined by the presence status associated with each endpoint in the order, or other suitable invitation delivery strategy.

The invite to existing activity application programming interface element 614 may be preferred When inviting a contact to join an existing conference and/or activity. When a conference and/or activity is already established, some collaborative parameters may not be negotiable, or may be less negotiable, for example, negotiable only within a range determined by collaborative parameters in use by current participants. In addition, less flexibility may limit the endpoints of a presence that qualify for participation and thus that are candidates for receiving an invitation.

The find capabilities by type element 616 may enable a collaboration services platform 302 (FIG. 3) user to query the presence associated with the presence object 600 for capabilities associated with one or more of a plurality of capability types. Examples of capability types include application types such as chat, audio and video, application capabilities such as audio output, audio input, video output, video input, endpoint resources such as bandwidth, audio quality, and video resolution, or any suitable collaborative capability type. The find capabilities by type element 616 may respond to the query with capabilities of individual endpoints and/or aggregate presence capabilities.

The find published objects by type element 618 may enable a collaboration services platform 302 (FIG. 3) user to query the presence associated with the presence object 600 for published objects associated with the presence, for example, the published objects accessible with the published object element 610. The published object type may be determined by an associated rich text string. For example, those published object 418 (FIG. 4) instances associated with the same rich text string may be determined to be of the same type.

The publish object element 620 may enable the publication of data associated with the presence. For example, the set of presence objects maintained by the published objects element 610 may be updated. In an embodiment of the invention, the publish object application programming interface element 620 may be incorporated into the published objects application programming interface element 610.

Figure 7:
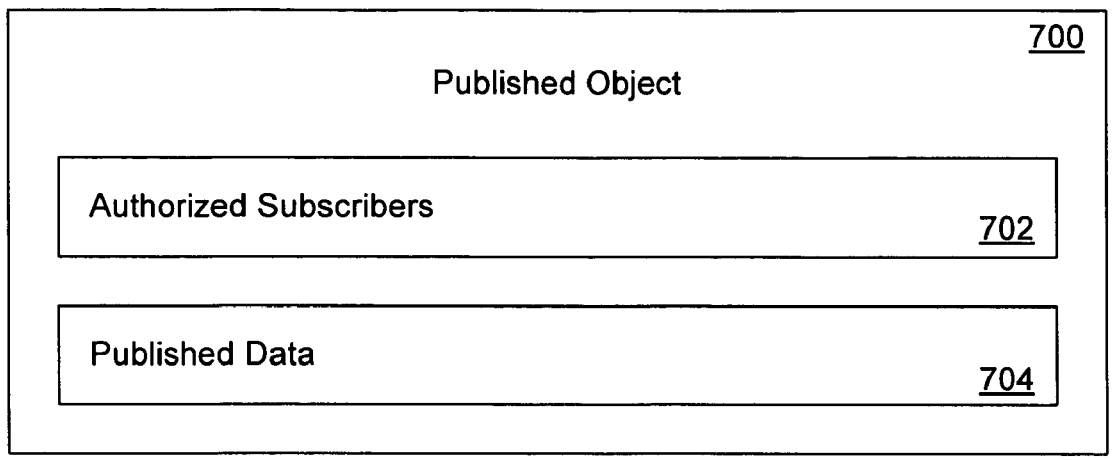
FIG. 7 is an object interface diagram depicting an example published object in accordance with an embodiment of the invention.

FIG. 7 depicts an example published object 700 in accordance with an embodiment of the invention. The published object 700 is suitable for incorporation in the collaboration object model 400 (FIG. 4). The published object 700 may incorporate application programming interface elements including an authorized subscribers element 702, and a published data element 704.

The authorized subscribers element 702 may reference one or more contact object 402 (FIG. 4) instances associated with contacts who are authorized to subscribed to the data associated with the published object 700. Data access control may be coarse grained, for example, allow or block, or fine grained, for example, including control over data create, read, update and delete privileges. The published data element 7084 may maintain a set of published data associated with the published object 700. Any suitable set of data may be published in association with the published object 700.

Figure 8:
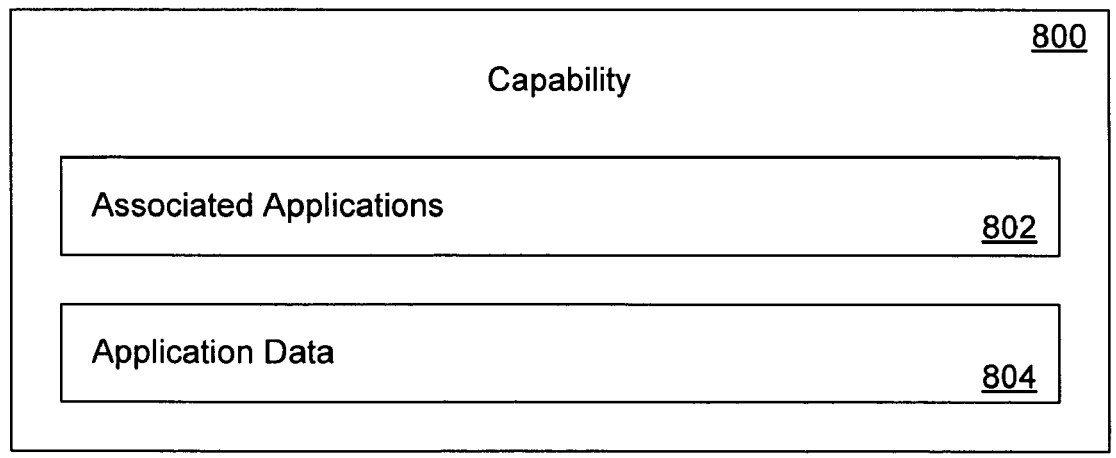
FIG. 8 is an object interface diagram depicting an example capability object in accordance with an embodiment of the invention.

FIG. 8 depicts an example capability object 800 in accordance with an embodiment of the invention. The capability object 800 is suitable for incorporation in the collaboration object model 400 (FIG. 4). The capability object 800 may incorporate application programming interface elements including an associated application element 802, and an application data element 804.

The associated applications element 802 may include a reference to a set of collaborative applications that implement the capability associated with the capability object 800. The application data element 804 may include data and/or a specification of data required to configure each of the set of collaborative applications referenced by the associated applications element 802.

Figure 9:
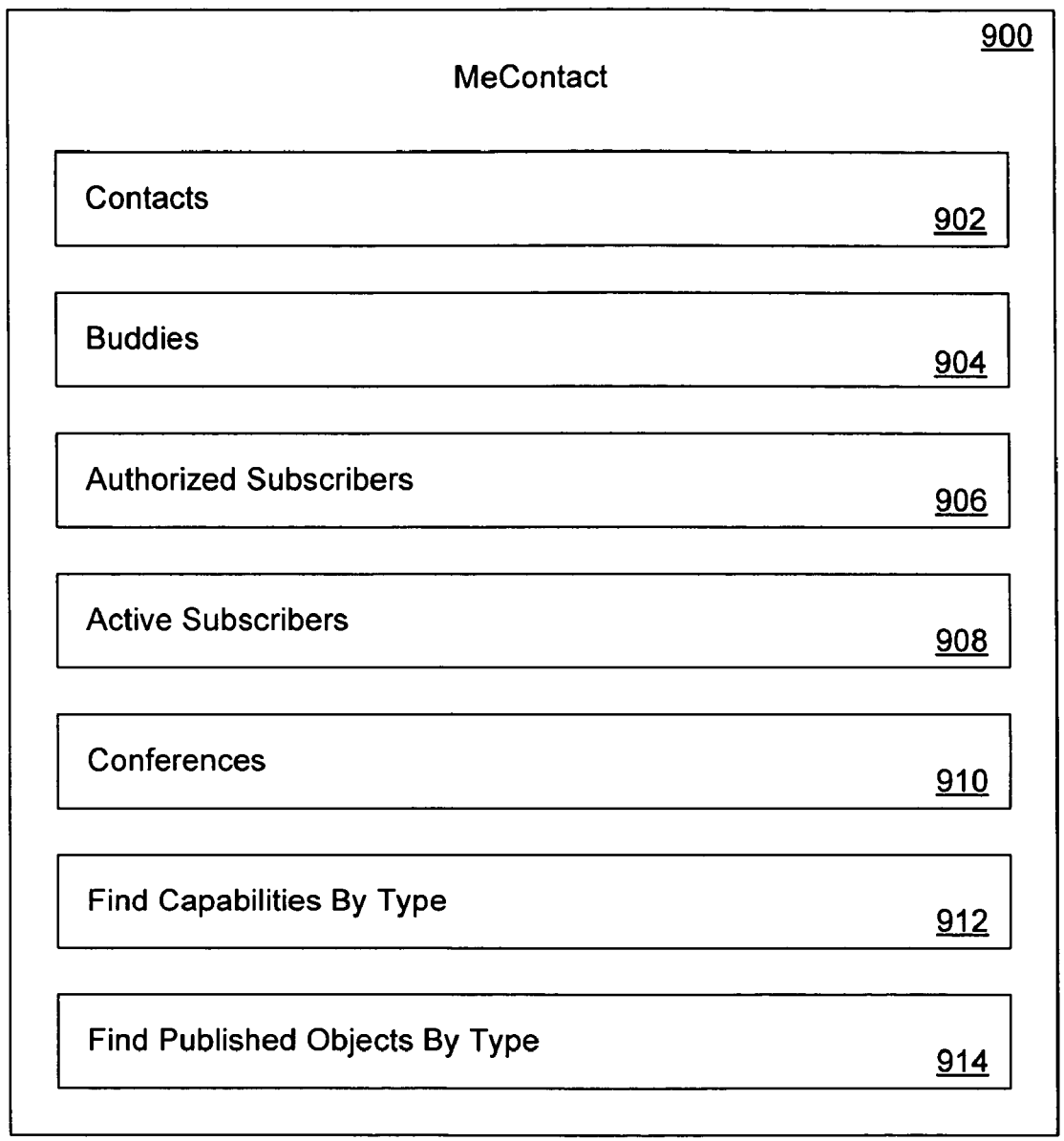
FIG. 9 is an object interface diagram depicting an example MeContact object in accordance with an embodiment of the invention.

FIG. 9 depicts an example MeContact object 900 in accordance with an embodiment of the invention. The MeContact object 900 is suitable for incorporation in the collaboration object model 400 (FIG. 4). The MeContact object 900 may incorporate application programming interface elements including a contacts element 902, a buddies element 904, an authorized subscribers element 906, an active subscribers element 908, a conferences element 910, a find capabilities by type element 912, and a find published objects by type element 914.

The contacts element 902 may include references to a set of contact object 402 (FIG. 4) instances associated with contacts known to the collaboration services platform 302 (FIG. 3) user associated with the MeContact object 900. The buddies element 904 may include references to a set of contact object 402 (FIG. 4) instances associated with contacts known to the collaboration services platform 302 (FIG. 3) user and that are also buddy class contacts, for example, as indicated by the buddy flag element 506 (FIG. 5) of the contact object 500.

Mere presence in the set of contact object 402 instances referenced by the buddies element 904 may indicate that the associated contact is a buddy class contact. The set of contact object 402 instances referenced by the contacts element 902 and the buddies element 904 may overlap, however, in at least one embodiment of the invention, the sets are exclusive.

The authorized subscribers element 906 may include references to a set of contact object 402 (FIG. 4) instances associated with contacts that are authorized to subscribe to published data associated with the MeContact object 900, such as capabilities data. Published data access control may be coarse grained, for example, block or allow access to all published data, or fine grained, for example, create, read, update and/or delete permissions for each published object 418, or combinations thereof.

The active subscribers element 908 may include references to a set of contact object 402 instances associated with contacts that are actively subscribed to data published by the collaboration services platform 302 (FIG. 3) user associated with the MeContact object 900. Of course, contact object 402 instances referenced by the active subscribers element 908 should be in accordance with the permissions maintained by the authorized subscribers element 906.

The conferences element 910 may include references to a set of conference object 414 (FIG. 4) instances associated with conferences in which the collaboration services platform 302 (FIG. 3) user associated with the MeContact object 900 is currently participating, in which the user has recently participated, and/or in which the user will soon participate.

The find capabilities by type element 912 may enable a collaboration services platform 302 (FIG. 3) user to query the contacts associated with the MeContact object 900 for capabilities associated with one or more of the plurality of capability types. For example, the find capabilities by type element 912 may query the contact object 402 (FIG. 4) instances referenced by the contacts element 902, the buddies element 904 and/or the MeContact object 900 itself. The find capabilities by type element 912 may respond to the query with capabilities of individual endpoints and/or aggregate capabilities. The find published objects by type element 914 may enable the user to query the contacts associated with the MeContact object 900 for published data. As with the find capabilities by type element 912, the find published objects by type element 914 may query the published object 418 instances referenced by the contacts element 902, the buddies element 904 and/or the MeContact object 900 itself.

Figure 10:
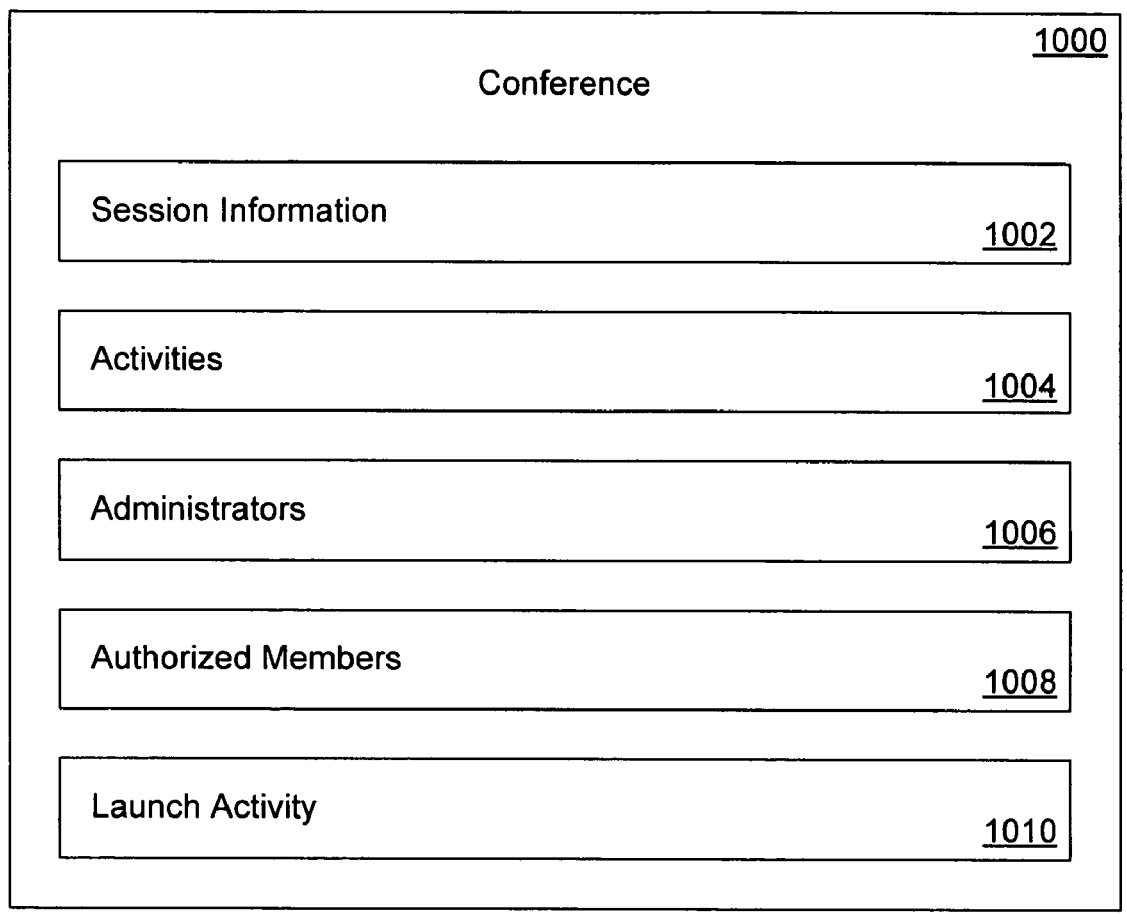
FIG. 10 is an object interface diagram depicting an example conference object in accordance with an embodiment of the invention.

FIG. 10 depicts an example conference object 1000 in accordance with an embodiment of the invention. The conference object 1000 is suitable for incorporation in the collaboration object model 400 (FIG. 4). The conference object 1000 may incorporate application programming interface elements including a session information element 1002, an activities element 1004, an administrators element 1006, an authorized members element 1008, and a launch activity element 1010.

In an embodiment of the invention, roles of a conference, for example, a conference associated with the conference object 1000, include organizing, managing and/or maintaining one or more collaborative activities in which one or more collaboration services platform 302 (FIG. 3) users are participating. The session information element 1002 may include conference level session information. Performance optimizations may be achieved by collecting activity level session information at the conference level. The activities element 1004 may include references to one or more activity object 416 (FIG. 4) instances.

The administrators element 1006 may reference one or more contact object 402 (FIG. 4) instances associated with contacts that are authorized to act as administrators for the conference. Administrative privileges may include adding and removing authorized participants and/or activities. The authorized members element 1008 may reference one or more contact object 402 instances associated with contacts that are authorized to participate in activities associated with the conference. Authorization may be coarse grained, for example, allow or block a particular contact from participating in all conference activities, fine grained, for example, permissions may be granted to launch new activities or end existing activities, to participate fully in individual activities or to participate in a limited way (e.g., "observer status"), or combinations thereof.

The launch activity element 1010 may add a new activity to the conference. Joining and leaving activities may be managed by the conference, by the activity, or by a combination of the two. In each case, the conference object 1000 application programming interface elements may enforce accordance with the administrators element 1006 and/or the authorized members element 1008.

Figure 11:
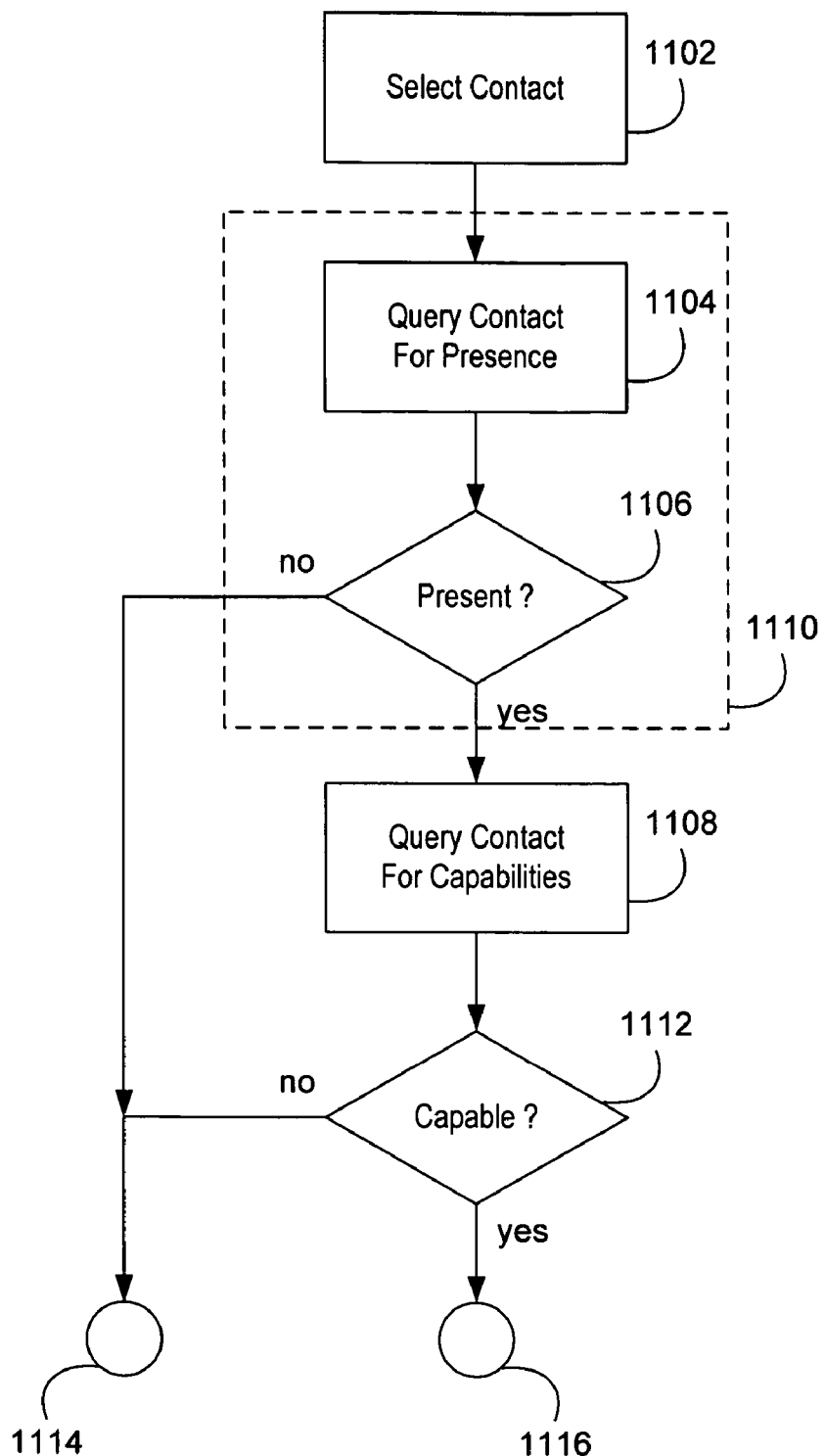
FIG. 11 is a flowchart depicting example steps performed by the collaboration services platform in accordance with an embodiment of the invention.

Detailed methods performed, for example, by the collaboration services platform 302 (FIG. 3) and in accordance with the collaboration object model 400 (FIG. 4) are now described. FIG. 11 depicts example steps performed by the collaboration services platform 302 in accordance with an embodiment of the invention. At step 1102, a contact object 402 instance may be selected. For example, a contact object 402 instance stored in the contact store 318 may be selected with a user interface of the contact management services 304.

At step 1104, the selected contact object 402 (FIG. 4) instance may be queried for its associated presence object 404 instance. For example, the presence element 504 (FIG. 5) of the selected contact object 500 may be utilized to access the associated presence object 404 instance.

At step 1106, it may be determined if the contact associated with the selected contact object 402 (FIG. 4) instance is present in the networked computing environment 200 (FIG. 2). For example, the aggregate presence status of the contact may be obtained from the aggregate status element 606 of the presence object 600 retrieved at step 1104, and, if the aggregate presence status of the contact is ONLINE, then the contact may be determined to be present. If the contact is determined to be present, the procedure may progress to step 1108. Otherwise the procedure may exit. The contact is unavailable for collaboration at this time.

Alternatively, steps 1104 and 1106 may be replaced with steps that subscribe to the presence information of the selected contact and wait until a notification indicates that the selected contact is present before proceeding to step 1108. This alternative is indicated with dashed line 1110.

At step 1108, the selected contact object 402 (FIG. 4) may be queried for a set of associated capability object 412 instances. For example, the find capabilities by type element 616 (FIG. 6) of the presence object 404 instance retrieved at step 1104 (and/or steps 1110) may be utilized to obtain the pertinent set of capabilities. The particular set of capabilities to be examined may depend upon the target collaborative activity or activities. For example, a conference involving voice may trigger a check for audio input capability. At step 1112, it may be determined if the selected contact has the required capabilities. If the selected contact does have the required capabilities, the procedure may progress to step 1202 of FIG. 12. Otherwise the procedure may exit. Step 1112 needn't be limited to a simple test. Step 1112 may include a negotiation, for example coordinated by the signaling service 308 (FIG. 3), to determine if any of the set of capabilities are sufficient for the target activity or activities.

Figure 12:
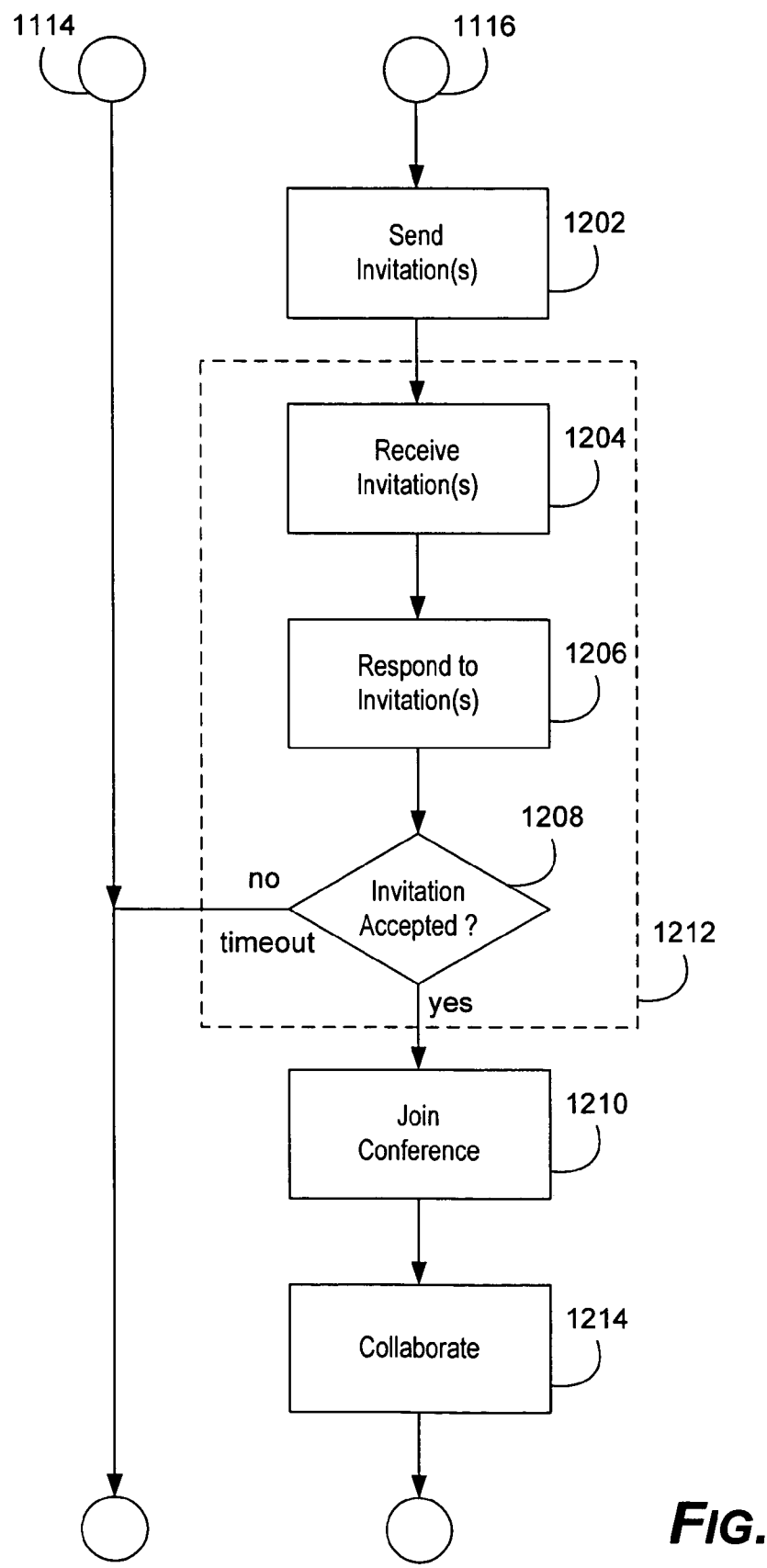
FIG. 12 is a flowchart depicting further example steps performed by the collaboration services platform in accordance with an embodiment of the invention.

FIG. 12 depicts further example steps performed by the collaboration services platform 302 in accordance with an embodiment of the invention. The steps of FIGS. 11 and 12 are connected by circles labeled 1114 and 1116. Having determined that the selected contact is both present in the networked computing environment 200 (FIG. 2) and capable of participating in the desired collaborative activity or activities, one or more invitations may be sent to the selected contact at step 1202. For example, an invitation may be sent by the invitation service 326 (FIG. 3) at the computer 212 (FIG. 2).

At step 1204, the one or more invitations may be received by the selected contact. For example, one of the invitations may be received by the invitation service 326 (FIG. 3) at the computer 208 (FIG. 2). At step 1206, the selected contact may respond to the one or more invitations. For example, the selected contact may utilize a user interface of the invitation service 326 at the computer 208 to respond to one of the invitations.

At step 1208, it may be determined if the invitation was accepted. For example, the invitation service 326 at the computer 212 may receive the response sent at step 1206, and the contents of the response may determine if the invitation is accepted. If the invitation is accepted, the procedure may progress to step 1210. Otherwise the procedure may exit.

Steps 1204, 1206 and 1208 are marked with dashed line 1212 to highlight the possibilities for procedural variations when responding to invitations. One reason to send out multiple invitations to the same activity is that the networked computing environment 200 (FIG. 2) presence of the selected contact may encompass multiple endpoints. For example, a collaboration services platform 302 (FIG. 3) user may send three invitations to the same activity from computer 212 to the computers 216, 206 and 208. For example, computer 216 may be an office desktop PC of the selected contact, computer 206 may be a laptop of the selected contact and computer 208 may be a personal digital assistant (PDA) of the selected contact. The invitation may be displayed to the selected contact at more than one endpoint. For example, the selected contact may decline or ignore the invitation at the computer 208 (the PDA in this example), but accept the invitation at the computer 206 (the laptop). A possibility is that the selected contact simply doesn't respond to the invitation. This may result in a timeout and an exit of the procedure.

Another possibility for steps 1212 is that the collaboration services platform 302 (FIG. 3) user at computer 212 (FIG. 2) sends out an invitation to an activity to each other computer 214 and 216 in the subnet 218. In this case, each contact may respond in parallel.

Having accepted the invitation, at step 1210, the selected contact may join an associated conference for the collaborative activity. For example, the conference may be hosted by at the computer 212 (FIG. 2) and the selected contact may join the conference from the computer 206 utilizing the signaling service 308 (FIG. 3) and/or the activity service 310. At step 1214, collaboration incorporating the activity may occur.

An example of the invitation service 326 (FIG. 3) is now described in more detail. In particular, interactions between the invitation service 326, the collaborative services platform 302 and collaborative applications distinct from the collaborative services platform 302 (although typically referenced by it) are highlighted. In an embodiment of the invention, the handling of such interactions contribute to the usability, extensibility, flexibility, maintainability and/or scalability of the collaboration services platform 302, and thus its suitability for wide scale adoption.

Figure 13:
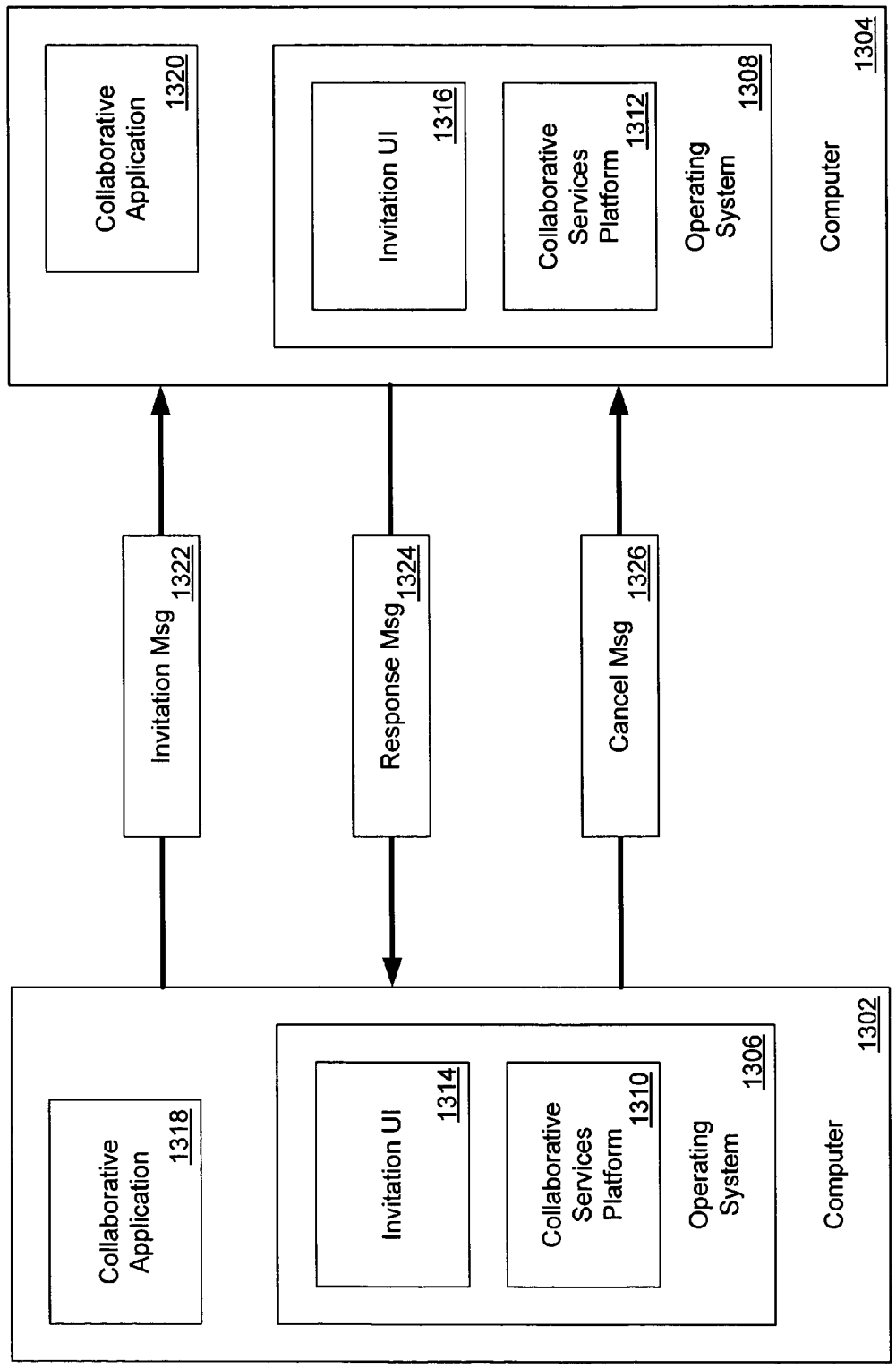
FIG. 13 is a schematic diagram depicting an example invitation scenario in accordance with an embodiment of the invention.

FIG. 13 depicts an example invitation scenario in accordance with an embodiment of the invention. A first computer 1302 may be tasked with initiating one or more collaborative activities with a second computer 1304. For example, the computers 1302 and 1304 may be any of the computers 204, 206, 208, 212, 214 or 216 in the networked computing environment 200 of FIG. 2. Each computer 1302 and 1304 may include a computer operating system 1306 and 1308. Each computer operating system 1306 and 1308 may include a collaborative services platform module 1310 and 1312. The computer operating systems 1302 and 1304 need not be the same. The collaborative services platform modules 1310 and 1312 may be in accordance with the collaborative services platform 302 (FIG. 3).

The computer operating systems 1306 and 1308 may include invitation user interfaces (UI) 1314 and 1316 such as graphical user interfaces (GUI). In an embodiment of the invention, the invitation user interfaces 1314 and 1316 are incorporated into the collaborative services platform modules 1310 and 1312 respectively. The computers 1302 and 1304 may further include collaborative applications 1318 and 1320. Although distinct from the collaborative services platform modules 1310 and 1312 in this example, in an embodiment of the invention, the collaborative applications 1318 and 1320 may be incorporated into the collaborative services platform modules 1310 and 1312.

A basic collaborative invitation protocol may include three messages: a collaboration invitation message 1322, a collaboration response message 1324, and an invitation cancel message 1326.

The collaboration invitation message 1322 may include an invitation identifier, one or more capability identifiers, application data and a message. The invitation identifier may uniquely identify the invitation. For example, the invitation identifier may be a globally unique identifier (GUID) as described in the Guid Structure section of the NET Framework Class Library, documentation version 1.1.1, in the Microsoft® Developer Network (MSDN®) Library. Each capability identifier may reference a capability object representing a collaborative capability required for the collaborative activities associated with the invitation. For example, each capability identifier may be a globally unique identifier (GUID). The application data may include and/or specify data to be passed to collaborative applications, for example, in order to initiate the collaborative activities. The message may be a rich text string containing standard or custom invitation text.

The collaboration response message 1324 may include an invitation identifier, an invitation response action, a response message and extended response data. The invitation identifier may identify the collaboration invitation to which the response message 1324 is responding. For example, the invitation identifier may be the GUID supplied by the collaboration invitation message 1322. The invitation response action may indicate a type of the response. For example, the invitation response may be one of: decline, accept, ignore and error. The response message may be a rich text string containing standard or custom invitation response text. The extended response data may include any suitable additional response data pertaining to the invitation and/or collaborative activities.

The invitation cancel message 1326 may include an invitation identifier identifying the invitation which the cancel message 1326 is canceling. For example, the collaboration invitation message 1322 may be sent from the computer 1302 to the computer 1304 to invite a user of the collaborative services platform 1312 to participate in a collaborative activity with a user of the collaborative service platform 1310. In response, the collaboration response message 1324 may be sent from the computer 1304 to the computer 1302 to indicate whether the invitation is, for example, accepted or declined. In an embodiment of the invention, it is possible for the user of the collaborative services platform 1310 to cancel the invitation by sending the invitation cancel message 1326 from the computer 1302 to the computer 1304.

Figure 14:
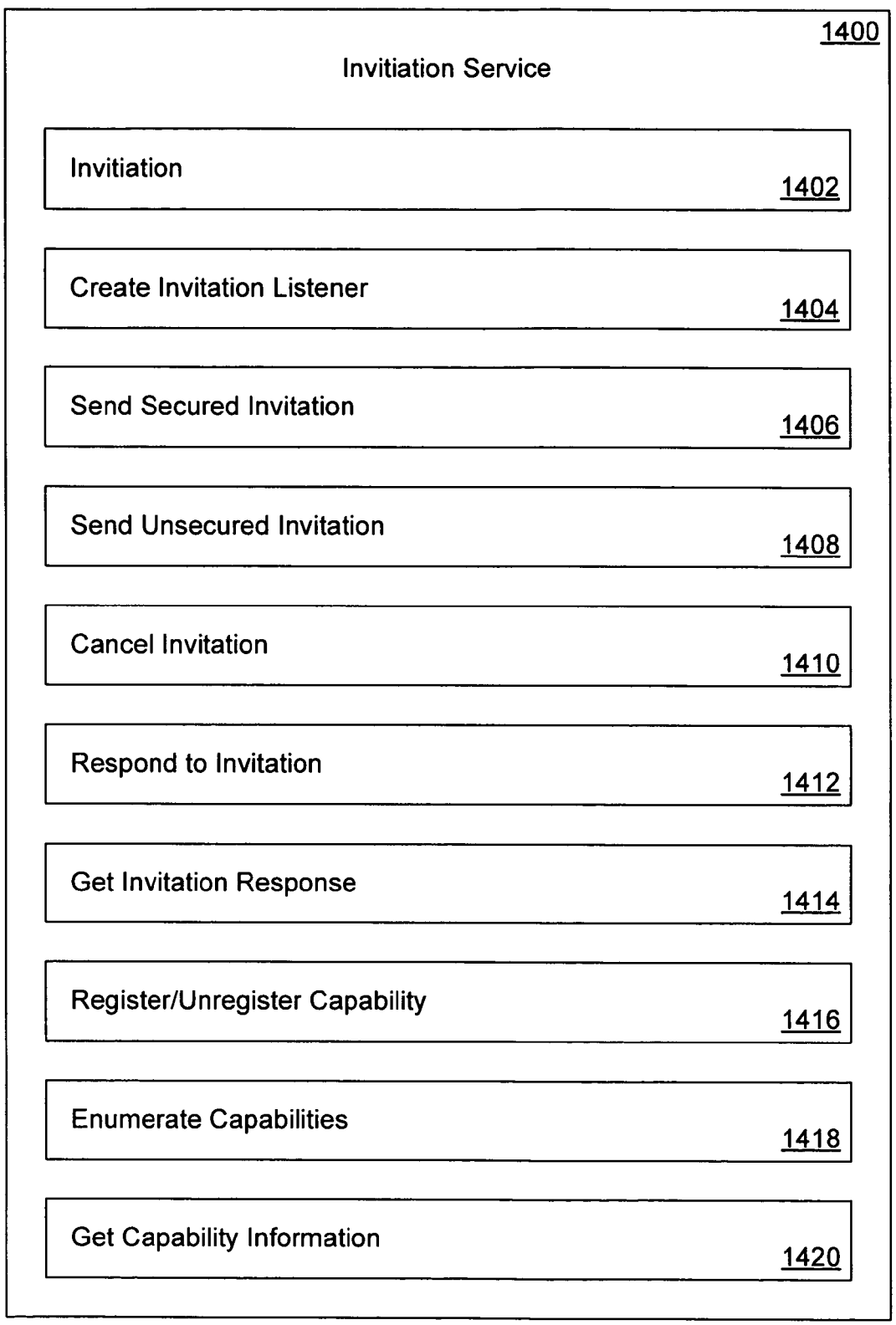
FIG. 14 is a schematic diagram depicting an example invitation service application programming interface in accordance with an embodiment of the invention.

Before describing example collaborative invitation methods in more detail, it will be helpful to describe an example application programming interface (API) of the invitation service 326 (FIG. 3). FIG. 14 depicts an example application programming interface (API) 1400 of the invitation service 326 in accordance with an embodiment of the invention. The invitation service API 1400 may include an invitation element 1402, a create invitation listener element 1404, a send secured invitation element 1406, a send unsecured invitation element 1408, a cancel invitation element 1410, a respond to invitation element 1412, a get invitation response element 1414, a register/unregister capability element 1416, an enumerate capabilities element 1418, and a get capability information element 1420. Although each application programming interface element 1402, 1404, 1406, 1408, 1410, 1412, 1414, 1416, 1418 and 1420 may be included in the application programming interface of the invitation service 326 (FIG. 3) incorporated into the collaborative services platform module 1310 and 1312 (FIG. 13) at each computer 1302 and 1304, different ones of the elements 1402, 1404, 1406, 1408, 1410, 1412, 1414, 1416, 1418 and 1420 may be utilized by the computers 1302 and 1304 depending upon whether the computer 1302, 1304 is an inviter, an invitee or both.

The invitation element 1402 may include and provide access to some or all of the same data as the collaboration invitation message 1322. For example, the collaboration invitation message 1322, or portions thereof, may be stored in and/or retrieved from the invitation service 326 (FIG. 3) with the invitation element 1402.

The create invitation listener element 1404 may instantiate an invitation listener at a collaborative endpoint such as the computers 1302 and 1304 (FIG. 13). Interface specification parameters may include an endpoint identifier such as an internet protocol (IP) address or P2P peer identifier (there may be multiple endpoints per computer 1302, 1304), a port identifier (there may be multiple communication ports per endpoint) and an invitation listener identifier for configuring or destroying the invitation listener. For example, the operating system 1308 may utilize the create invitation listener element 1404 to create an invitation listener listening at a standard invitation and/or collaborative services port. The collaborative application 1320 may utilize the create invitation listener element 1404 to create a an invitation listener at a custom invitation port that is dedicated to listening for invitations to collaborate with the collaborative application 1320.

The send secured invitation element 1406 may enable secure sending of invitation messages 1322 (FIG. 13). Interface specification parameters may include a reference to a contact object 402 (FIG. 4) instance, a reference to an endpoint object 410 instance, a reference to the invitation message 1322 to be sent, a reference to a synchronization object of a thread of execution such as an event to be signaled once a response to the invitation has been received, and a reference to an invitation identifier to be set by the send secured invitation element 1406. The invitation message 1322 may be sent to the contact associated with the referenced contact object 402 instance. If the endpoint object 410 instance is provided, the invitation message 1322 may be sent to the associated endpoint, otherwise the invitation message 1322 may be sent to each endpoint in the presence of the contact associated with the referenced contact object 402 instance.

A decision to participate in a collaborative activity may have security consequences. For example, a decision to participate in two-way file sharing may expose data to modification and/or deletion. As a result, it may be that a user of the collaborative services platform 302 (FIG. 3) decides to accept collaborative invitations only from trusted sources. In an embodiment of the invention, a secure communications connection may be established between users that have previously exchanged contact information. For example, the contact information may contain cryptographic authentication credentials, and the secure communications connection may be established with convention secure protocols such as secure socket layer (SSL) or security service provider (SSP) techniques for overlay networks.

However, the user may also decide to allow insecure invitations under certain circumstances. The send unsecured invitation element 1408 may be similar to the send secured invitation element 1406 except that, for example, there is no requirement that the invitation sender and recipient have previously exchanged contact information. For example, the send unsecured invitation element 1408 may be utilized to broadcast invitation messages 1322 to each computer 212, 214 and 216 (FIG. 2) on the subnet 218. Insecure invitations may facilitate ad hoc collaboration and collaboration in facilitated social settings such as multiplayer games.

The cancel invitation element 1410 may enable sending of cancel messages 1326 (FIG. 13). Interface specification parameters may include an invitation identifier such as the invitation identifier set by the send secured invitation element 1406 of the send unsecured invitation element 1408. The respond to invitation element 1412 may enable sending of the response message 1324 (FIG. 13). Interface specification parameters may include the invitation identifier and the invitation response action.

Each of the send secured invitation element 1406 and the send unsecured invitation element 1408 may have both synchronous and asynchronous versions. For example, the asynchronous version may send the invitation message 1322 (FIG. 13) and then allow execution of additional instructions in the thread of execution before checking for a response to the invitation. In contrast, the synchronous version may wait without executing further instructions in the thread of execution until the response message 1324 is received or a timeout occurs. The get invitation response element 1414 may be utilized to check for and/or wait for a response to an invitation message 1322 that was sent asynchronously. Interface specification parameters may include the invitation identifier and reference to be set to the response message 1324 when it arrives. Synchronous versions of the send invitation elements 1406 and 1408 need not include a reference to a thread synchronization object.

The invitation service 1400 may maintain a registry of endpoint capabilities. The register/unregister capability element 1416 may enable registration and deregistration of capabilities with the invitation service 1400. Interface specification parameters may include references to one or more capability object 412 (FIG. 4) instances and an indication as to whether the capability or capabilities pertain to a particular user of an endpoint or to all users of the endpoint. Each capability object 412 instance may be associated with a capability identifier, for example, a globally unique identifier (GUID). In an embodiment of the invention, each capability is associated with a particular collaborative application 1318, 1320 (FIG. 3). The invitation service 1400 may include separate application programming interface elements for register capability and unregister capability.

The enumerate capabilities element 1418 may enable enumeration of capabilities registered with the invitation service 1400. Interface specification parameters may include an indication as to whether the enumeration should contain capabilities associated with a particular user of an endpoint or with all users of an endpoint. In an embodiment of the invention, the enumeration includes capability identifiers instead of, for example, references to capability object 412 (FIG. 4) instances. The capability object 412 instance may then be retrieved with the get capability information element 1420.

Example collaborative invitation methods are now described in more detail. A basic context for collaborative invitation is whether the user interacts with a specific application in order to send and/or respond to an invitation (specific scenario), or whether the user interacts with an application-independent mechanism to send and/or respond to the invitation (generic scenario). The four scenarios: from generic to generic, from specific to generic, from generic to specific, and from specific to specific are described below with respect to FIGS. 15-18.

Figure 15:
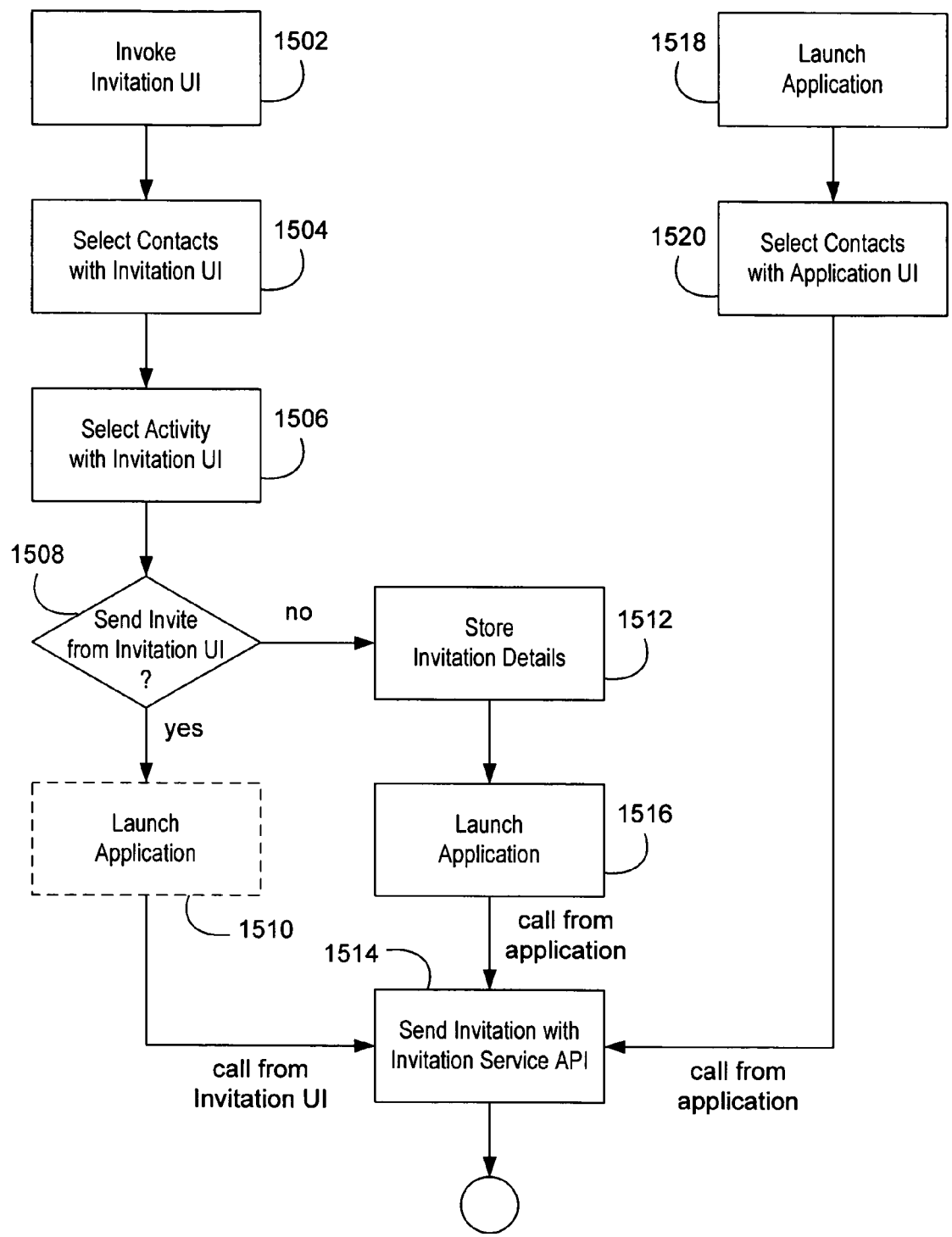
FIG. 15 is a flowchart depicting example steps for sending an invitation in accordance with an embodiment of the invention.

FIG. 15 depicts example steps for sending an invitation in accordance with an embodiment of the invention. At step 1502, a generic invitation user interface (UI) may be invoked. For example, the collaborative services platform 302 (FIG. 3) may invoke a user interface of the invitation service 326. At step 1504, one or more contacts may be selected with the generic invitation user interface. For example, the user interface of the invitation service 326 may interact with the contact management service 304 to display a list of known contacts of the user, or, for example, a list of buddy class contacts, and the user may graphically select a set of contacts from those displayed.

At step 1506, an activity may be selected with the generic invitation user interface. For example, the user interface of the invitation service 326 (FIG. 3) may interact with the activity service 310 to display a list of available collaborative activities, or, for example, a list of popular or most recently used activities, and the user may graphically select a collaborative activity from those displayed. At step 1508, it may be determined if the generic invitation user interface is to send the invitation, or, for example, if the invitation is to be sent from a specific collaborative application. For example, the determination may depend upon a configurable parameter of the invitation service 326. If it is determined that the generic invitation user interface is to send the invitation, then the procedure may progress to step 1510. Otherwise, the procedure may progress to step 1512.

At step 1510, the collaborative application associated with the activity selected at step 1506 may be launched. Step 1510 is depicted with a dashed outline to indicate that, although the application may be launched at this time, the generic invitation user interface may retain control of the thread of execution and progress to step 1514. This is in contrast to step 1516.

At step 1512, details pertinent to the invitation collected so far such as the contacts selected at step 1504 and any configuration parameters associated with the activity selected at step 1506 may be stored for retrieval by the collaborative application associated with the activity. At step 1516, the collaborative application is launched and control of the procedure is surrendered by the generic invitation user interface.

At step 1514, the invitation may be sent with the invitation service 1400 (FIG. 14) application programming interface, for example, with the send secured invitation element 1406 or the send unsecured invitation element 1408 as described above. Although the same application programming interface element 1406, 1408 may be utilized to send the invitation, when the procedure progresses from step 1510 to step 1514, the element 1406, 1408 is invoked by the generic invitation user interface, whereas when the procedure progresses from step 1516 to step 1514, the element 1406, 1408 is invoked by the collaborative application. As a result, the interface specification parameters passed to the element 1406, 1408 may differ.

The procedure beginning at step 1502 describes one of the "from generic" scenarios because the generic invitation user interface is utilized. In contrast, step 1518 begins a "from specific" scenario. At step 1518, a collaborative application may be launched. For example, the application 1318 (FIG. 13) may be launched in a conventional manner by the computer operating system 1306. Step 1518 is a pre-condition for step 1520, and quite some time may pass between the steps 1518 and 1520.

At step 1520, one or more contacts may be selected with a user interface of the collaborative application 1318 (FIG. 13). For example, the collaborative application 1318 may interact with the contact management service 304 (FIG. 3) of the collaborative services platform 1310 to display a list of know contacts of the application user, or, for example, a list of buddy class contacts, and the application user may select a set of contacts from those displayed. In contrast to the progression from step 1504, the selection of a collaborative activity is not necessary and the procedure may progress to step 1514. The collaborative application 1318 may determine the collaborative activity. However, in an embodiment of the invention, the collaborative application 1318 may support multiple activities, in which case an equivalent of step 1506 may be appropriate. At step 1514, the send invitation element 1406 or 1408 (FIG. 14) may be invoked by the collaborative application 1318.

Figure 16:
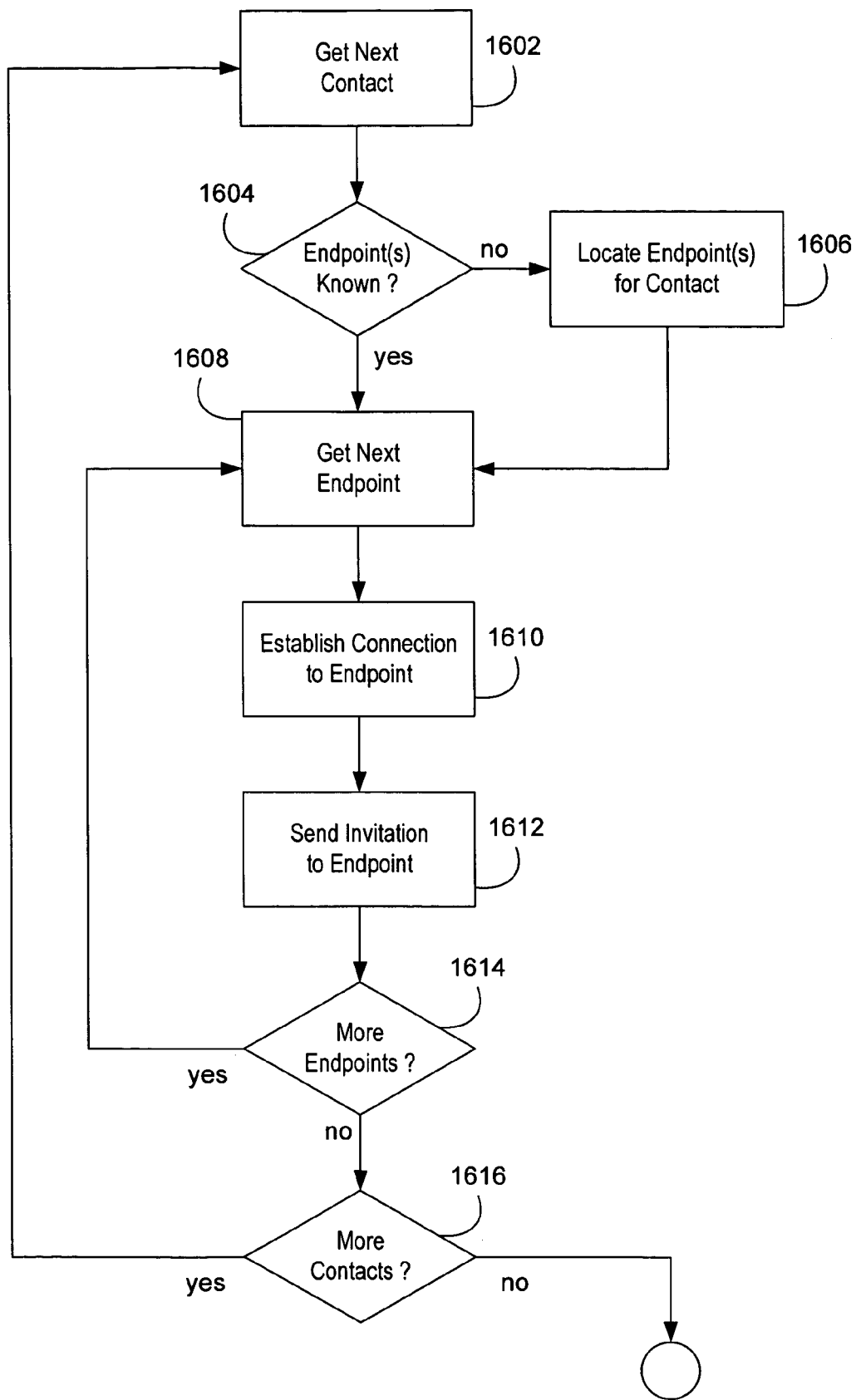
FIG. 16 is a flowchart depicting example steps performed by the invitation service to send an invitation in accordance with an embodiment of the invention.

FIG. 16 depicts example steps performed by the invitation service 1400 (FIG. 14) to send an invitation in accordance with an embodiment of the invention. At step 1602, a next candidate contact is selected. For example, the candidate contact may be selected from among the set selected at step 1504 or 1520 of FIG. 15.

At step 1604, it may be determined if endpoints of the candidate contact are known. For example, the presence object 404 (FIG. 4) referenced by the contact object 402 representing the candidate contact may be queried for its set of endpoint objects 410. If no endpoints of the candidate contact are known (e.g., the result of the query is an empty set), the procedure may progress to step 1606. If endpoints of the candidate contact are known, the procedure may progress to step 1608. At step 1606, endpoints for the candidate contact may be located. For example, the invitation service 326 (FIG. 3) may interact with the contact location service 322 to determine a set of valid endpoints for the candidate contact.

At step 1608, a candidate endpoint may be selected from among the known endpoints for the candidate contact. At step 1610, a communicative connection may be established with the candidate endpoint. For example, the connection may be established with the connectivity service 316 (FIG. 3). At step 1612, the invitation may be sent to the candidate endpoint, for example, with an invitation message 1322 (FIG. 13).

At step 1614, it may be determined if there are more candidate endpoints. If there are more candidate endpoints, the procedure may return to step 1608 to select a next candidate endpoint. Otherwise the procedure may progress to step 1616. At step 1616, it may be determined if there are more candidate contacts. If there are more candidate contacts, the procedure may return to step 1602 to select a next candidate contact. Otherwise, the invitation may be considered sent.

Figure 17:
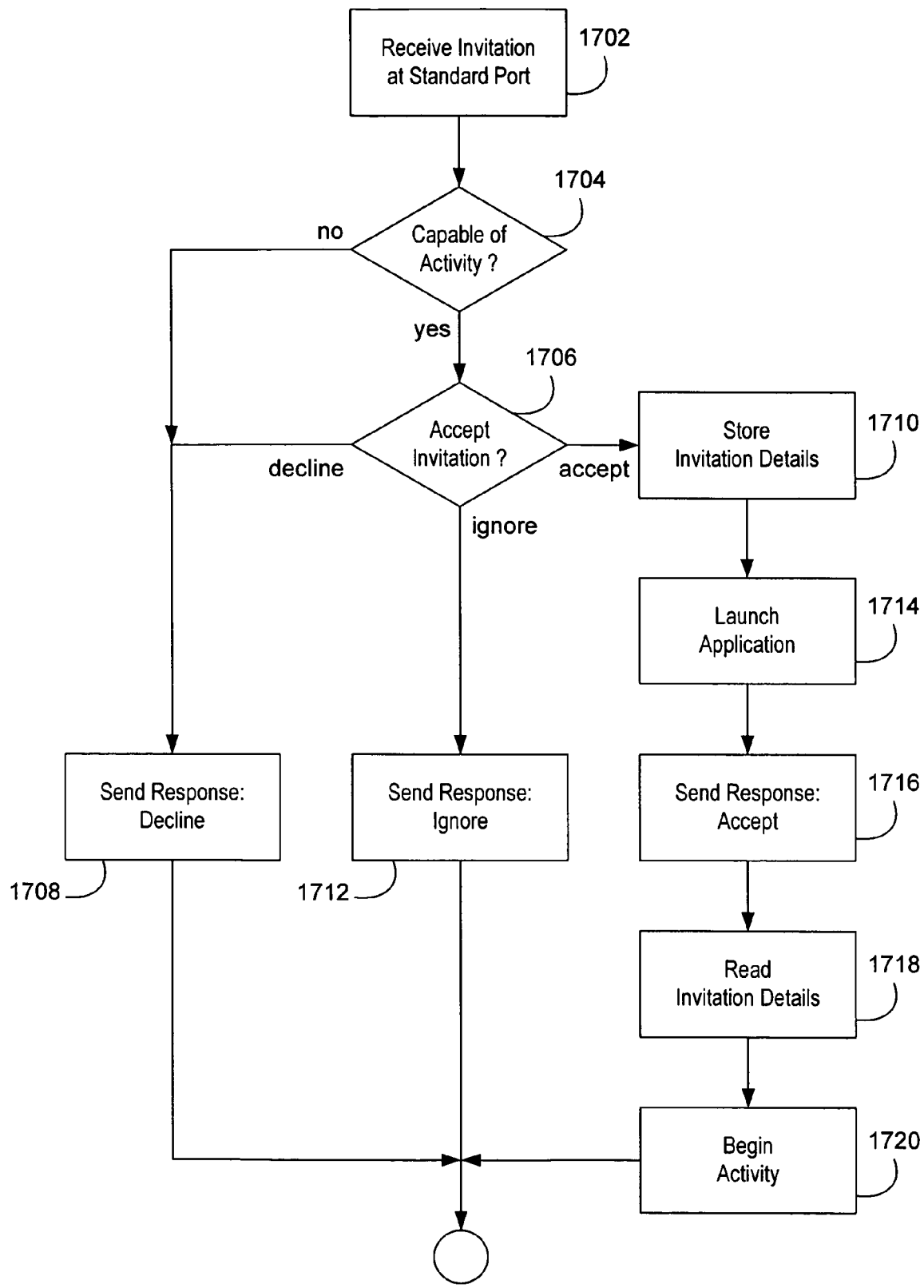
FIG. 17 is a flowchart depicting example steps for responding to an invitation from a generic invitation user interface in accordance with an embodiment of the invention.

The "from generic" and "from specific" parts of the four scenarios have been described, now the "to generic" and "to specific" parts are described with reference to FIGS. 17 and 18 respectively. FIG. 17 depicts example steps for responding to a collaborative invitation from a generic invitation user interface in accordance with an embodiment of the invention. Where the collaborative invitation was sent to multiple endpoints, the steps depicted in FIGS. 17 and/or 18 may be performed at each endpoint.

At step 1702, the collaborative invitation may be received at a standard communications port of the collaboration services platform 302 (FIG. 3). For example, the invitation message 1322 (FIG. 13) may arrive at a TCP/IP port reserved for the collaborative services platform 302 and monitored by the invitation service 326.

At step 1704, it may be determined if the endpoint is capable of participating in the activity associated with the invitation. For example, the invitation service 326 (FIG. 3) may compare the capability identifier(s) in the invitation message 1322 (FIG. 13) with the capabilities that have been registered with the invitation service 328. Alternatively, the MeContact object 406 (FIG. 4) associated with a user of the endpoint may be queried for its associated set of capability objects 412 and those may be compared with the capability identifier(s) in the invitation message 1322. If it is determined that the endpoint is capable of participating in the activity associated with the invitation, then the procedure may progress to step 1706. Otherwise, the procedure may progress to step 1708.

At step 1706, the user may accept, decline or ignore the invitation. For example, the invitation service 326 (FIG. 3) may display a generic invitation user interface having user interface elements corresponding to the decisions: accept, decline or ignore. The user may accept, decline or ignore the invitation by selecting the corresponding user interface element. If the user accepts the invitation, the procedure may progress to step 1710. If the user declines the invitation, the procedure may progress to step 1708. If the user ignores the invitation, the procedure may progress to step 1712.

At step 1708, the response message 1324 (FIG. 13) may be sent indicating that the invitation is declined. For example, the response message 1324 may be sent with the respond to invitation element 1412 (FIG. 14) of the invitation service 1400 application programming interface. Similarly, at step 1712, the response message 1324 may be sent indicating that the user is choosing to ignore the invitation. The invitation element 1412 may also be used to send this response. In an embodiment of the invention, the ability to send an explicit ignore response enhances an efficiency of collaborative services platform 302 (FIG. 3).

At step 1710, the details of the accepted invitation may be stored for retrieval by the collaborative application 1320 (FIG. 13) associated with the collaborative activity. For example, some or all of the contents of the invitation message 1322 may be stored by the invitation service 326 (FIG. 3) with the invitation element 1402 (FIG. 14) of the application programming interface. At step 1714, the collaborative application 1320 may be launched by the invitation service 326.

At step 1716, the response message 1324 (FIG. 13) indicating acceptance of the invitation may be sent, for example, utilizing the respond to invitation element 1412 (FIG. 14) of the invitation service 1400 application programming interface. In progressing from step 1716 to step 1718, control of execution may pass to the collaborative application 1320 launched at step 1714. Alternatively, the collaborative application 1320 may be launched in a parallel thread of execution, the threads synchronized as necessary, and the invitation service thread that received the invitation at step 1702 may exit after responding at step 1716.

At step 1718, the collaborative application 1320 (FIG. 13) may read the invitation details stored at step 1710. For example, the stored invitation details may result in some (re)configuration of the collaboration application 1320. At this point, the collaboration application 1320 may be ready to begin participating in the collaborative activity, and, at step 1720, participation in the collaborative activity may begin.

Figure 18:
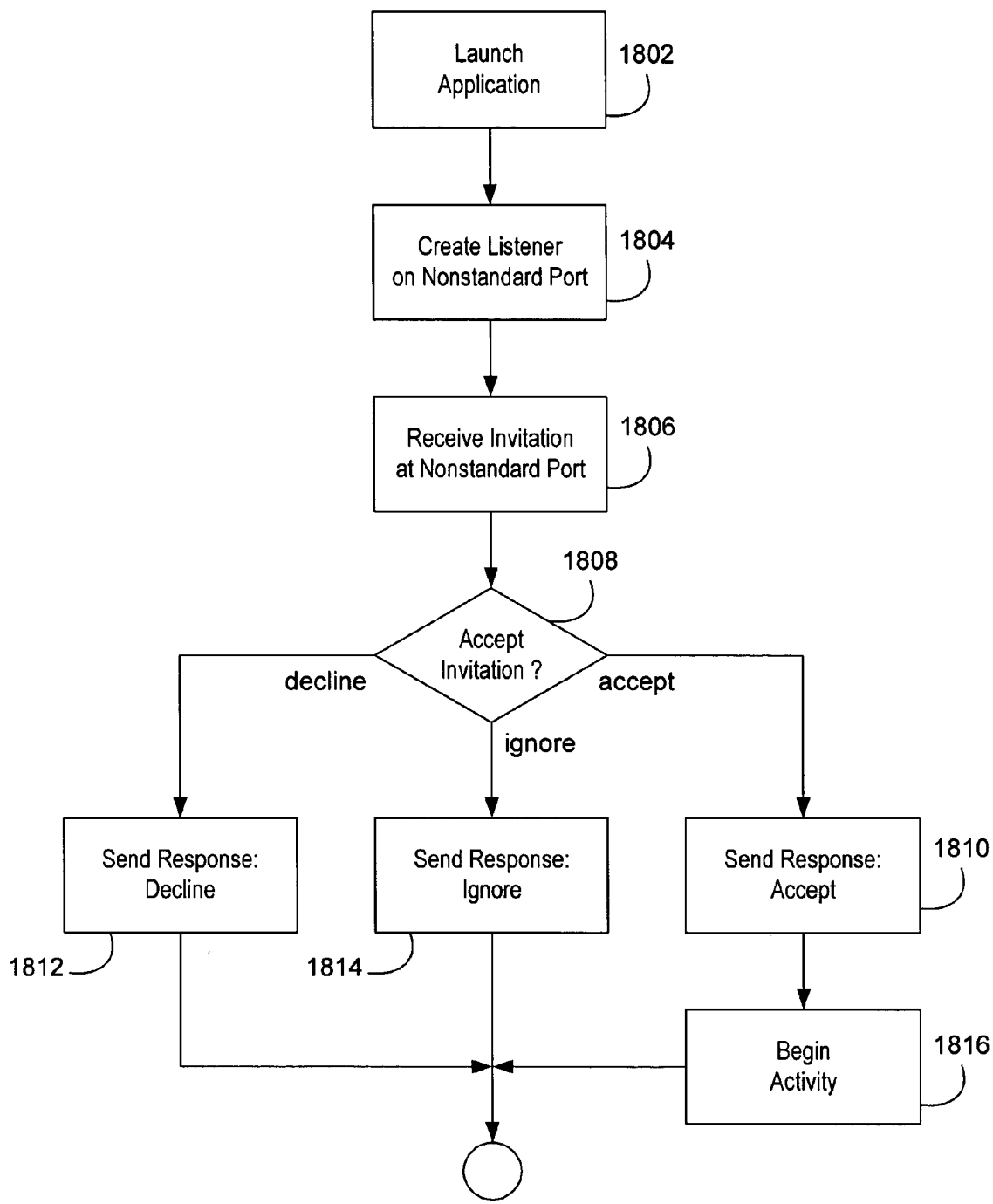
FIG. 18 is a flowchart depicting example steps for responding to an invitation from an application specific user interface in accordance with an embodiment of the invention.

FIG. 18 depicts example steps for responding to a collaborative invitation from a specific application user interface in accordance with an embodiment of the invention. At step 1802, a collaborative application may be launched. For example, the collaborative application 1320 (FIG. 13) may be launched in a conventional manner by the computer operating system 1304. At step 1804, the collaborative application 1320 may create an invitation listener on a nonstandard, application specific collaboration communications port. For example, the collaborative application 1320 may utilize the create invitation listener element 1404 (FIG. 14) of the invitation service 1400 application programming interface to create an invitation listener on a TCP/IP port different from the port reserved for the collaborative services platform 302 (FIG. 3).

Some time later, at step 1806, a collaborative invitation may be received at the nonstandard port. For example, the invitation message 1322 (FIG. 13) sent at step 1514 (FIG. 15) may have been sent to the application specific port and/or endpoint. At step 1808, the collaborative application 1320 user may accept, decline or explicitly ignore the invitation. For example, the collaborative application 1320 may display a user interface having user interface elements corresponding to the decisions: accept, decline and ignore. The user may then choose a desired response by selecting the corresponding user interface element. If the user accepts the invitation, the procedure may progress to step 1810. If the user declines the invitation, the procedure may progress to step 1812. If the user explicitly ignores the invitation, the procedure may progress to step 1814.

At each of steps 1810, 1812 and 1814, the appropriate invitation response may be sent to the inviter. Each step 1810, 1812 and 1814 may, for example, utilize the respond to invitation element 1412 (FIG. 14) of the invitation service 1400 to send the response message 1324 (FIG. 13) with the invitation response action set to accept, decline or ignore, respectively. Since the desired collaboration application 1320 (FIG. 13) is already launched, then, if the invitation was accepted, the collaborative activity may begin without further delay at step 1816.

Example methods for collaborative presence publication are now described in more detail. In particular, serverless presence publication, that is, an ability to publish collaborative presence information independent of a need for dedicated server computers, is advantageous in an embodiment of the invention. For example, serverless networked computing environments, peer-to-peer networks, or overlay networks may provide for better scalability than networks and network applications requiring dedicated server computers. The networked computing environment 200 (FIG. 2) may support a peer-to-peer or overlay network. Each of the computers 204, 206, 208, 212, 214 and 216 may support one or more peers of the peer-to-peer network. Each peer may be a collaborative endpoint and be associated with an endpoint object 410 (FIG. 4) instance.

As described above, collaborative presence may be represented by the presence object 404 (FIG. 4). Any suitable part, including all, of the presence object 404 may be published to users of the collaborative services platform 302 (FIG. 3). In addition, programmatic object instances reference by a presence object 404 instance may be published, including endpoint objects 410, capability objects 412 and the more generic published objects 418.

In an embodiment of the invention, however, one time publishing is typically not enough. Presence information may change. For example, published objects 418 may be updated by collaborative applications, aggregate status and/or presence status associated with a particular endpoint may change throughout the day, endpoints may be added or removed from the presence of a particular contact, for example, by a networked wireless device being turned on and off or moving in and out of a wireless network coverage area, endpoint capabilities may change as new collaborative applications are installed. Effective collaboration may require consistently updated presence information. In an embodiment of the invention, collaborative presence information is distributed in a serverless networked computing environment, such as the networked computing environment 200 (FIG. 2), with presence subscribe and presence notify messages.

Figure 19:
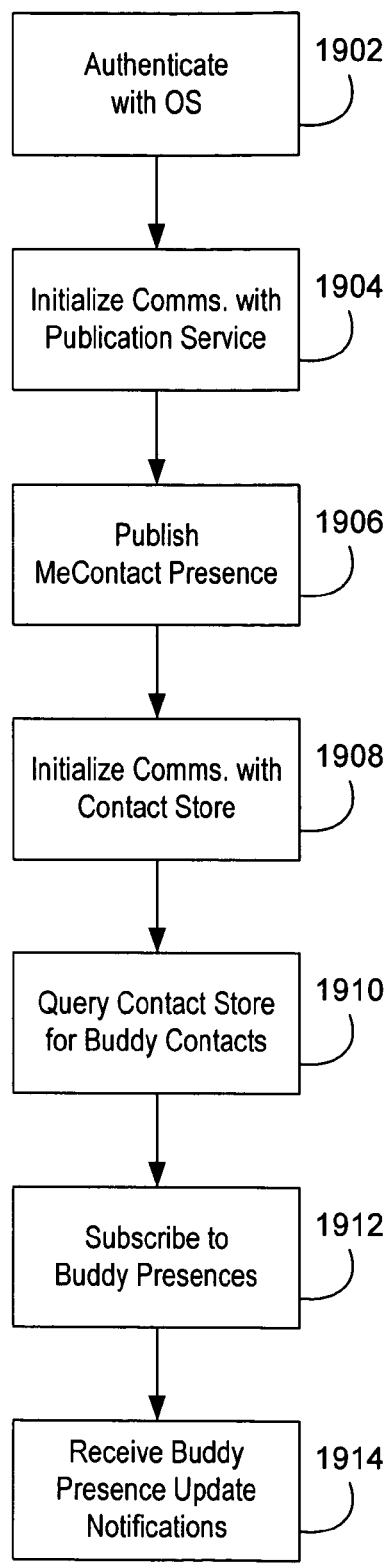
FIG. 19 is a flowchart depicting example steps for participating in serverless presence publishing in accordance with an embodiment of the invention.

FIG. 19 depicts example steps for participating in serverless presence publishing in accordance with an embodiment of the invention. At step 1902, a computer user may authenticate with an operating system (OS) of the computer. For example, the user may login to one of the computers 204, 206, 208, 212, 214 or 216 (FIG. 2) of the networked computing environment 200. Suitable computer operating systems include computer operating systems capable of supporting the collaborative services platform 302 (FIG. 3) such as any suitable version of the "MICROSOFT WINDOWS" or "UNIX" computer operating systems. Authenticating with the computer operating system may establish a computer-recognized identity for the computer user, and, in particular, may associate the computer user with a MeContact object 406 (FIG. 4) instance.

At step 1904, communications with the publication service 306 (FIG. 3) of the collaborative services platform 302 may be initialized. As described above, the publication service 306 may be serverless. For example, at step 1904 the computer user may join a peer-to-peer (P2P) network incorporating the publication service 306. At step 1906, some or all of the data contained in and/or referenced by the MeContact object 406 (FIG. 4) associated with the computer user may be published to the publication service 306, for example, with one or more presence notify messages, thus establishing the collaborative presence of the computer and collaborative services platform 302 user.

At step 1908, communications with the contact store 318 (FIG. 3) may be initialized. For example, the contact store may be a conventional data store such as a database and initializing communications with the contact store 318 may include establishing a communications session with the data store. At step 1910, the contact store 318 may be queried for buddy class contacts of the user. In an embodiment of the invention, querying the contact store 318 includes de-referencing one or more references to contact objects 402 (FIG. 4) included in the buddies element 904 (FIG. 9) of the MeContact object 406.

At step 1912, subscriptions may be placed to the presences of the buddy class contacts, for example, with presence subscribe messages as described below in more detail with reference to FIGS. 20 and 21. At step 1914, in response to the subscriptions, presence update notifications may be received.

For example, presence notify messages may be sent through the peer-to-peer network when changes occur to presences having associated subscriptions.

Figure 20:
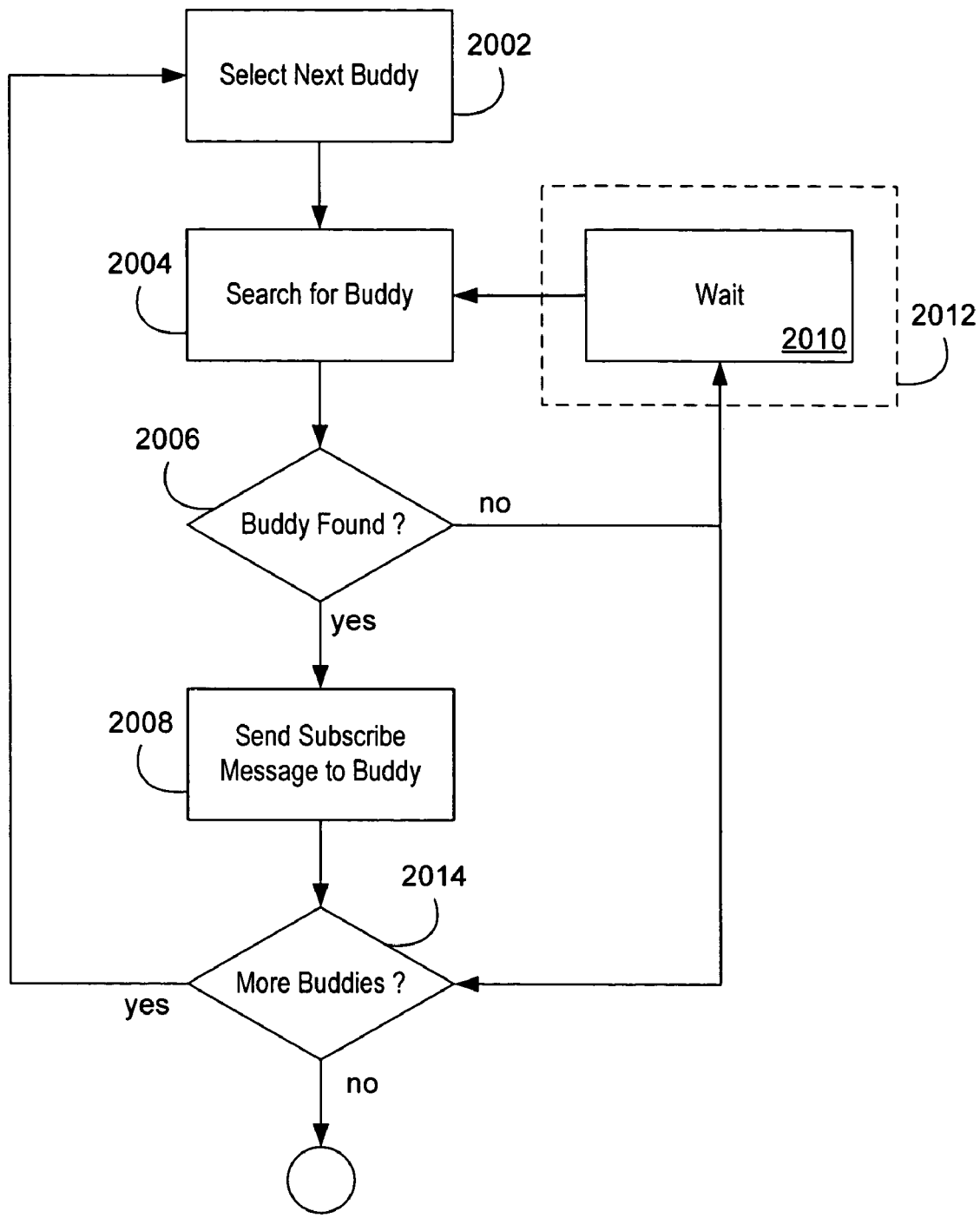
FIG. 20 is a flowchart depicting example steps for placing collaborative presence subscriptions in accordance with an embodiment of the invention.

FIG. 20 depicts example steps for placing presence subscriptions in accordance with an embodiment of the invention. For example, the steps depicted by FIG. 20 may be performed as part of step 1912 (FIG. 19). A set of buddy class contacts to which subscriptions are to be placed may be available, for example, from step 1914 or the like. At step 2002, a next candidate buddy class contact may be selected from the set.

At step 2004, a search may be made for the buddy class contact. For example, a peer name resolution protocol (PNRP) may be utilized to locate an endpoint associated with the buddy class contact in the peer-to-peer network. Alternatively, or in addition, a search may be made throughout a local network partition such as the subnet 218 (FIG. 2) for the contact. Any suitable network partition may be established and/or searched for the contact.

The search may not be successful. For example, the buddy class contact may not have an associated endpoint in the peer-to-peer network and/or the local network partition. At step 2006, it may be determined if the buddy class contact was found. For example, the peer name resolution protocol may successful resolve a name of the buddy class contact to an associated collaborative endpoint (e.g., peer) in the peer-to-peer network, or a reply may be received to a message broadcast throughout the local network partition identifying an associated endpoint (e.g., TCP/IP address and communications port number) for the buddy class contact. If the buddy class contact is found, the procedure may progress to step 2008. Otherwise, it may be assumed that the absence is temporary, for example, because the contact has been classified as a buddy, and the procedure may progress to step 2010.

Since being classified as a buddy may carry the assumption that the contact is a typically active collaborative participant, in an embodiment of the invention, periodically searching for missing buddy class contacts sufficiently enhances an effectiveness of the collaborative services platform 302 (FIG. 3) to be a justified feature in spite of increased demand on computational and network resources. The procedure may wait at step 2010 between searches. For example, the period between searches may be 10 minutes. Step 2010 is surrounded by a dashed line 2012 to indicate that the wait, and possibly subsequent steps, may occur in a separate thread of execution. After instantiating the separate thread of execution for the wait step 2010, the main thread of execution may progress to step 2014.

Having found the buddy class contact, at step 2008, a presence subscribe message may be sent to an endpoint associated with the contact, for example, the endpoint found at step 2004. The presence subscribe message may specify subscription to some or all of the collaborative presence information associated with the contact. For example, the presence subscribe message may specify subscription to presence information accessible through one or more of the rich text description element 602 (FIG. 6), the endpoints element 604, the aggregate status element 606, the aggregate capabilities element 608, and the published objects element 610 of the presence object 600 application programming interface. Presence notify messages sent in response to the subscription, for example, at step 1914 (FIG. 19) may need only be sent when a part of the presence changes that is covered by the subscription, and may need only include the part of the presence information that has changed.

At step 2014, it may be determined if there are more buddy class contacts in the set of buddy class contacts. If there are more such contacts, then the procedure may return to step 2002 to select a next contact from the set. Otherwise, the procedure may progress to further steps such as step 1914 (FIG. 19) and/or step 2102 of FIG. 21.

Figure 21:
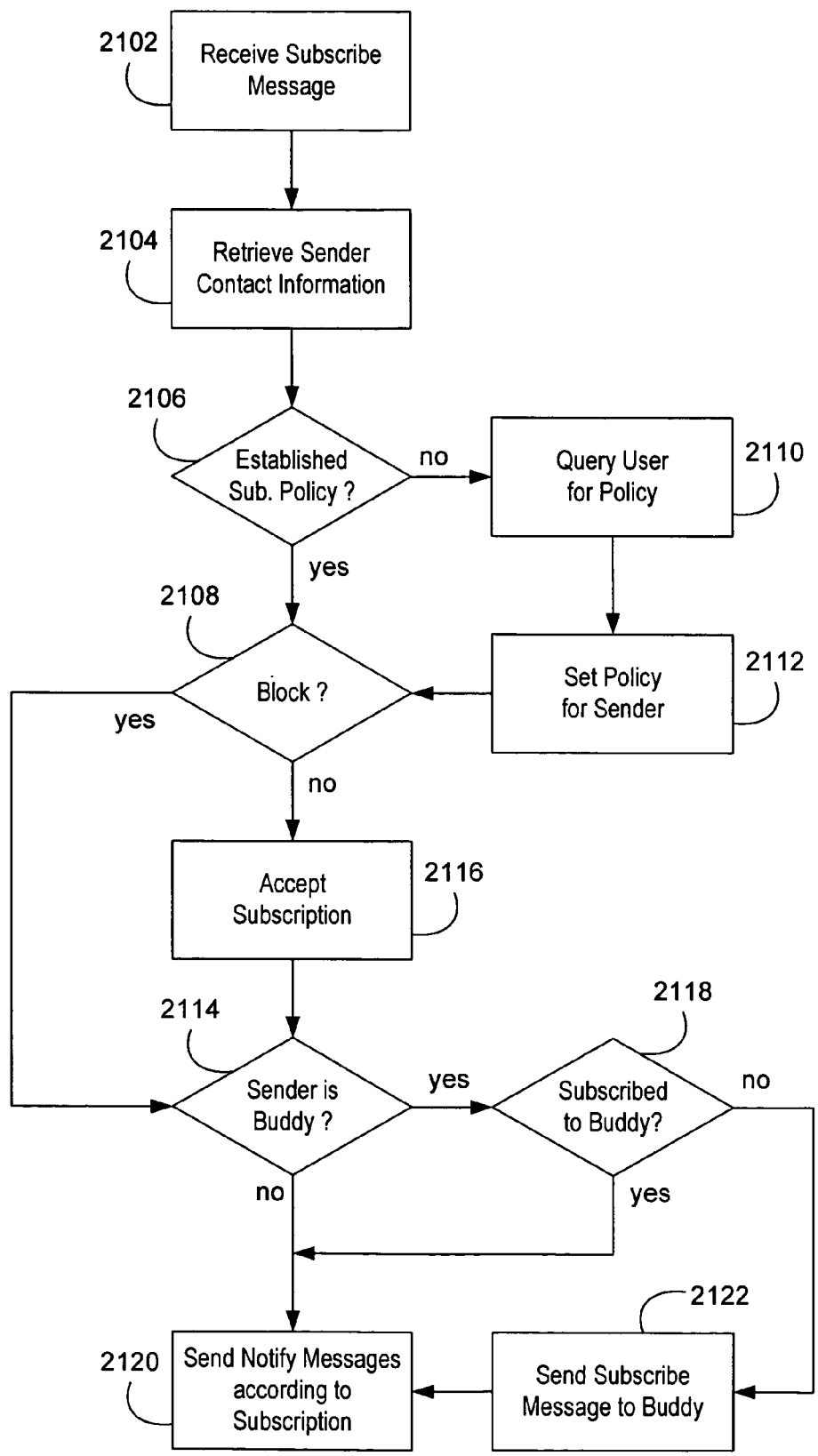
FIG. 21 is a flowchart depicting example steps for accepting collaborative presence subscriptions in accordance with an embodiment of the invention.

FIG. 21 depicts example steps for accepting presence subscriptions in accordance with an embodiment of the invention. At step 2102, a presence subscribe message may be received. For example, this may be the presence subscribe message sent at step 2008 (FIG. 20). At step 2104, contact information associated with the sender of the presence subscribe message may be retrieved. For example, the presence subscribe message may reference a contact object 402 (FIG. 4) instance associated with the sender. The receiver of the presence subscribe message may retrieve the contact information of the sender with the contact management service 304 (FIG. 3).

At step 2106, it may be determined if a subscription policy has been established for the sender of the presence subscription message. For example, the contact information associated with the sender that is managed by the contact management service 304 (FIG. 3) may include an association between the sender and the subscription policy for the sender. Alternatively, a subscription policy may be in place for all subscribers, or for some group of subscribers of which the sender is a member.

Examples of simple subscription policies include: block and allow. That is, block subscription requests from the contact, or allow subscription requests from the contact. In an embodiment of the invention, the subscription policy for the sender is determined by the set of contact object 402 (FIG. 4) instances referenced by the authorized subscribers element 906 (FIG. 9) of the MeContact object 406 instance associated with the receiver. If a contact object 402 instance associated with the sender is in set referenced by the authorized subscribers element 906, then the sender is allowed, otherwise the sender is blocked.

In an embodiment of the invention, more sophisticated subscription policies are possible. For example, more sophisticated subscription policies may block and/or allow subscription to one or more subsets of the presence information of the subscriber. Allowing subscription to the aggregate status 606 (FIG. 6) and the rich text description 602 of the presence object 600, and blocking subscription to other presence object elements 604, 608, 610 is one possible example. Any suitable subset, including all, of the presence object elements 602, 604, 606, 608 and 610, and/or programmatic objects 410, 412, 418 referenced by the presence object elements 602, 604, 606, 608 and 610 may be the subject of a subscription policy and/or a subscription.

If a subscription policy is in place for the sender of the subscription message, the procedure may progress to step 2108. Otherwise, the procedure may progress to step 2110. At step 2110, the user of the collaborative services platform 302 (FIG. 3) associated with the collaborative presence that is the subject of the subscription may be queried for a subscription policy with respect to the sender of the presence subscription message. For example, the publication service 306 may present a user interface (e.g., a graphical user interface or GUI) displaying contact information associated with the sender and subscription policy options such as block and allow. The user may then select the subscription policy for the sender with the user interface.

At step 2112, the subscription policy selected by the user may be set for the sender. For example, the subscription policy may be associated with the sender through the contact management service 304 (FIG. 3) of the collaborative services platform 302, or a reference to the contact object 402 (FIG. 4) instance associated with the sender may be added to the set of references maintained by the authorized subscribers element 906 (FIG. 9) of the MeContact object 406 instance associated with the receiver. At step 2108, with a subscription policy with respect to the sender established, it may be determined if that subscription policy is to block subscriptions. If the subscription policy is to block subscriptions from the sender, then the procedure may progress to step 2114. Otherwise, the procedure may progress to step 2116.

At step 2116, the collaborative presence subscription may be accepted. For example, the subscription specified by the presence subscription message may be associated with the MeContact object 406 associated with the receiver through the contact management service 304 (FIG. 3). In an embodiment of the invention, the subscription specified by the presence subscription message is accepted by adding the contact object 402 (FIG. 4) instance associated with the sender to the set of contact object 402 instances referenced by the active subscribers element 908 (FIG. 9) of the MeContact object 406 instance associated with the receiver. Where subscriptions are more sophisticated than allow and block, the subscription specified by the presence subscription message may be filtered with respect to the subscription policy associated with the sender before being accepted. For example, if the subscription is to all presence information, but the subscription policy limits subscription to aggregate status, then the accepted subscription will be to aggregate status only. Together, steps 2108 and 2116 may ensure that the subscription is accepted in accordance with the subscription policy.

At step 2114, it may be determined if the sender of the presence subscribe message is a buddy class contact of the receiver. For example, the set of contact object 402 (FIG. 4) instances referenced by the buddies element 904 (FIG. 9) of the MeContact object 900 associated with the receiver may be checked for a contact object 402 instance associated with the sender of the presence subscribe message. The publication service 306 (FIG. 3) may determine if the sender of the presence subscribe message is a buddy class contact of the receiver with the contact management service 304. If the sender of the presence subscribe message is a buddy class contact of the receiver, then the procedure may progress to step 2118. Otherwise, the procedure may progress to step 2120.

Having determined that the sender of the presence subscribe message is a buddy class contact of the receiver, at step 2118, it may be determined if the receiver of the presence subscribe message is currently subscribed to the presence of the sender. For example, the publication service 306 (FIG. 3) application programming interface may have an enumerate subscriptions element enabling enumeration of a set of subscriptions placed by a specified contact, and the set of subscriptions may be checked for a subscription placed to the presence of the sender. Alternatively, or in addition, contact information referenced by the buddies element 904 (FIG. 9) of the MeContact object 406 (FIG. 4) instance associated with the receiver may include an indication, for each buddy class contact, as to whether a presence subscription has been accepted by the contact.

If it is determined that the receiver of the presence subscribe message is currently subscribed to the presence of the sender, then the procedure may progress to step 2120. Otherwise, the receiver may subscribe to the presence of the sender at step 2122. For example, it may be that the receiver of the presence subscribe message has previously performed the steps described above with reference to FIG. 20 searching for the sender, but that the sender was not online and the receiver is waiting at step 2010 (FIG. 20) before searching again. Now the sender has come online and sent out presence subscription messages. Rather than continuing to wait, and then expend computational and network resources searching again for the sender, in an embodiment of the invention, the receiver may respond to the presence subscribe message from the buddy class contact with a reciprocal presence subscribe message. At step 2122, the reciprocal presence subscribe message may be sent to the buddy class contact as described above for step 2008 (FIG. 20).

At step 2120, one or more presence notify messages may be sent to the sender of the presence subscribe message in accordance with the presence subscription accepted at step 2116. An initial presence notify message may contain all presence information matching the accepted subscription, or, for example, a set of presence differences over presence information that the receiver is known to already possess. Subsequent to the initial presence notify message, additional presence notify messages may be sent to notify subscribers of collaborative presence updates. For example, after one or more updates to the collaborative presence of a particular collaborative services platform 302 (FIG. 3) user, one or more presence notify messages may be sent to the publication service 306 (FIG. 3). For each subscription to the presence of the user, the publication service 306 may determine if the one or more subsets of presence information referenced by the presence notify message match the subscription. For each matching subscription, the publication service 306 may propagate the presence notify message to the collaborative services platform 302 user that placed the subscription.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A computer readable storage medium having thereon computer-executable instructions for collaborative invitation comprising:

selecting at least one contact with an invitation user interface;

determining if an invitation is to be initiated to be sent to said at least one contact from the invitation user interface or directly from a collaborative application, wherein the collaborative application is distinct from the invitation user interface, is launched from an operating system, and is associated with at least one of: a capability associated with an endpoint, or a collaborative activity;

when it is determined that the invitation is to be initiated to be sent from the invitation user interface then, at least:

launching the collaborative application; and initiating the sending of the invitation to said at least one contact from the invitation user interface; and when it is determined that the invitation is to be initiated to be sent directly from the collaborative application, at least:

launching the collaborative application; and initiating the sending of the invitation to said at least one contact directly from the collaborative application.

2. The computer readable storage medium of claim 1, wherein the invitation user interface is a graphical user interface of an invitation service.

3. The computer readable storage medium of claim 1, wherein:

the instructions further comprise selecting a collaborative activity via the invitation user interface; and launching the collaborative application comprises launching a collaborative application associated with the selected collaborative activity.

4. The computer readable storage medium of claim 1, further comprising storing invitation details for retrieval by the collaborative application.

5. The computer readable storage medium of claim 1, wherein initiating the sending of the invitation comprises initiating the sending of the invitation with a send invitation element of an application programming interface of an invitation service.

6. The computer readable storage medium of claim 5, wherein the application programming interface of the invitation service comprises:

the send invitation element;

a respond to invitation element for responding to a received invitation; and a cancel invitation element for canceling a sent invitation.

7. The computer readable storage medium of claim 1, wherein initiating the sending of the invitation comprises, for each of said at least one contact:

determining a set of multiple endpoints for the contact; and for each endpoint in the set of multiple endpoints, at least:

establishing a communication connection to the each endpoint; and sending the invitation to the each endpoint over the communication connection.

8. The computer readable storage medium of claim 7, wherein:

a representation of each contact includes a contact programmatic object instance that references a set of endpoint programmatic object instances; and determining the set of multiple endpoints for the contact comprises:
    querying the contact programmatic object instance corresponding to the contact for the set of endpoint programmatic object instances; and
    if the set of endpoint programmatic object instances is empty, determining the set of multiple endpoints for the contact with a contact location service.

9. A computer readable storage medium having thereon computer-executable instructions for collaborative invitation comprising:
    receiving, both directly at a collaborative services platform and directly at a collaborative application, an invitation to participate in a collaborative activity, wherein the collaborative application is distinct from the collaborative services platform, is launched from an operating system and is associated with the collaborative activity;
    presenting the invitation to a user of at least one of the collaborative services platform or the collaborative application along with an ability to choose one of accept, decline and ignore in response to the invitation;
    receiving the choice of the user; and
    sending a response to the sender of the invitation, the response including an indication of the choice of the user.

10. The computer readable storage medium of claim 9, wherein:
    the invitation is received at an endpoint of the collaborative services platform; and
    the instructions further comprising determining if the endpoint is capable of participating in the collaborative activity.

11. The computer readable storage medium of claim 10, wherein:
    the invitation includes a specification of a set of capabilities required to be able to participate in the collaborative activity;
    the collaborative services platform includes a registry of capabilities of the endpoint;
    determining if the endpoint is capable of participating in the collaborative activity comprises comparing the set of capabilities specified by the invitation to the registered capabilities of the endpoint.

12. The computer readable storage medium of claim 9, wherein:
    the invitation is received at one of a standard communications port for the collaborative services platform and a nonstandard communications port specific to the collaborative application;
    if the invitation is received at the standard communications port and the user chooses to accept the invitation, the instructions further comprise:
        storing at least some information contained in the invitation for retrieval by the collaborative application;
        launching the collaborative application; and
        beginning the collaborative activity; and
    if the invitation is received at the nonstandard communications port and the user chooses to accept the invitation, the instructions further comprise beginning the collaborative activity.

13. The computer readable storage medium of claim 12, further comprising:
    launching the collaborative application; and
    creating an invitation listener on a nonstandard communications port for the collaborative application.

14. The computer readable storage medium of claim 9, wherein sending the response to the sender of the invitation comprises sending the response with a respond to invitation element of an application programming interface of an invitation service.

15. A computer readable storage medium having thereon computer-executable instructions implementing an application programming interface for a collaborative invitation service comprising computer-executable instructions for:
    an operating system;
    a collaboration services platform included in the operating system,
    the collaborative invitation service included in the collaboration services platform;
    an invitation service application programming interface providing access to the collaborative invitation service, including:
        an invitation element for providing access to invitation data corresponding to a first invitation to participate in a collaborative activity;
        a send invitation element for sending the first invitation to at least one contact of a user of a collaborative services platform;
        a respond to invitation element for responding to a received invitation; and
        a cancel invitation element for canceling a sent invitation; and
    at least one collaborative application, wherein the at least one collaborative application is distinct from the collaboration services platform, is launched from the operating system, is associated with at least one of: a capability associated with an endpoint, or a collaboration activity, and is configured to utilize the invitation service application programming interface to directly send and receive invitations.

16. The computer readable storage medium of claim 15, wherein the invitation data comprises:
    an invitation identifier; and
    at least one capability identifier.

17. The computer readable storage medium of claim 15, wherein:
    the send invitation element comprises a send secured invitation element for secured sending of the first invitation; and
    the invitation service application programming interface further comprises a send unsecured invitation element for unsecured sending of the first invitation.

18. The computer readable storage medium of claim 15, wherein:
    the send invitation element comprises an asynchronous send invitation element for asynchronously sending the first invitation; and
    the invitation service application programming interface further comprises a synchronous send invitation element for synchronously sending the first invitation.

19. The computer readable storage medium of claim 15, wherein the invitation service application programming interface further comprises a create invitation listener element for instantiating an invitation listener at a collaborative endpoint.

20. The computer readable storage medium of claim 15, wherein the invitation service application programming interface further comprises:

a register capability element for registering collaborative capabilities with the collaborative invitation service;

an unregister capability element for deregistering collaborative capabilities with the collaborative invitation service; and an enumerate capabilities element for enumerating capabilities registered with the collaborative invitation service.

* * * * *